United States Patent
Sannan et al.

(10) Patent No.: US 9,123,940 B2
(45) Date of Patent: Sep. 1, 2015

(54) COATING LIQUID, COATING LIQUID FOR MANUFACTURING ELECTRODE PLATE, UNDERCOATING AGENT, AND USE THEREOF

(75) Inventors: Takanori Sannan, Chuo-ku (JP);
Shinya Tsuchida, Chuo-ku (JP);
Nobuyuki Kobayashi, Chuo-ku (JP);
Shinichiro Aoyagi, Chuo-ku (JP)

(73) Assignee: DAINICHISEIKA COLOR & CHEMICALS MFG. CO, LTD., Tokyo (JP)

( * ) Notice: Subject to any disclaimer, the term of this patent is extended or adjusted under 35 U.S.C. 154(b) by 543 days.

(21) Appl. No.: 12/737,003

(22) PCT Filed: May 28, 2009

(86) PCT No.: PCT/JP2009/059743
§ 371 (c)(1),
(2), (4) Date: Nov. 30, 2010

(87) PCT Pub. No.: WO2009/147989
PCT Pub. Date: Dec. 10, 2009

(65) Prior Publication Data
US 2011/0091771 A1 Apr. 21, 2011

(30) Foreign Application Priority Data

Jun. 2, 2008 (JP) .................................. 2008-144890
Feb. 9, 2009 (JP) .................................. 2009-027819
Feb. 26, 2009 (JP) .................................. 2009-044240
Mar. 13, 2009 (JP) .................................. 2009-061899

(51) Int. Cl.
| | |
|---|---|
| *H01M 4/62* | (2006.01) |
| *H01M 4/66* | (2006.01) |
| *C09D 129/04* | (2006.01) |
| *C09D 101/08* | (2006.01) |
| *C09D 103/04* | (2006.01) |
| *C09D 105/00* | (2006.01) |
| *H01B 1/24* | (2006.01) |
| *B05D 5/12* | (2006.01) |
| *H01G 9/04* | (2006.01) |
| *H01G 9/155* | (2006.01) |
| *H01M 4/139* | (2010.01) |
| *C09D 5/00* | (2006.01) |
| *C09D 5/24* | (2006.01) |
| *H01G 11/38* | (2013.01) |
| *H01G 11/26* | (2013.01) |
| *H01G 11/48* | (2013.01) |
| *H01G 11/50* | (2013.01) |

(52) U.S. Cl.
CPC ............... *H01M 4/139* (2013.01); *C09D 5/002* (2013.01); *C09D 5/24* (2013.01); *H01G 11/26* (2013.01); *H01G 11/38* (2013.01); *H01G 11/48* (2013.01); *H01G 11/50* (2013.01); *H01M 4/625* (2013.01); *H01M 4/661* (2013.01); *H01M 4/667* (2013.01); *Y02E 60/122* (2013.01); *Y02E 60/13* (2013.01)

(58) Field of Classification Search
CPC ........ H01M 4/62; H01M 4/66; C09D 129/04; C09D 101/08; C09D 103/04; C09D 105/00; H01B 1/24; B05D 5/12; H01G 9/04; H01G 9/155
USPC .......... 429/217, 211; 524/503, 210, 106, 173, 524/379, 29, 32, 321, 286, 287; 252/182.1, 252/511; 427/77; 361/502, 523
See application file for complete search history.

(56) References Cited

U.S. PATENT DOCUMENTS

2010/0062262 A1 3/2010 Kobayashi et al.

FOREIGN PATENT DOCUMENTS

| EP | 0 600 718 A2 | 6/1994 |
|---|---|---|
| EP | 0 606 533 A2 | 7/1994 |
| EP | 1 634 922 A1 | 3/2006 |
| JP | 63-010456 A | 1/1988 |

(Continued)

OTHER PUBLICATIONS

European Patent Office, Extended European Search Report for European Patent Application No. EP 09 75 8256, Feb. 20, 2012, European Patent Office, Rijswijk, Netherlands.

(Continued)

*Primary Examiner* — Karie O'Neill Apicella
(74) *Attorney, Agent, or Firm* — Hamre, Schumann, Mueller & Larson, P.C.

(57) ABSTRACT

This invention relates to a coating formulation, a coating formulation for manufacturing an electrode plate and an undercoating formulation, and their use. These coating formulations are all characterized by containing, in a polar solvent, a hydroxyl-containing resin and an organic acid and/or a derivative thereof. The hydroxyl-containing resin is at least one of (1) a polyvinyl acetal resin, (2) an ethylene-vinyl alcohol copolymer, (3) a modified and/or unmodified polyvinyl alcohol, and (4) a cyanoethyl-containing polymer. According to the present invention, there is provided a coating formulation capable of forming a coating of excellent adhesion and solvent resistance on a surface of a metal material such as an aluminum material. Also provided are a coating formulation for manufacturing an electrode plate for a battery or a polarizable electrode plate for a capacitor, in which an active material layer has excellent adhesion to a collector made of an aluminum foil, copper foil or the like and is also equipped with excellent electrolyte resistance and improved contact resistance to the collector, an undercoating formulation, the electrode plate and its manufacturing process, the battery, and the capacitor.

30 Claims, No Drawings

(56) References Cited

FOREIGN PATENT DOCUMENTS

| | | | |
|---|---|---|---|
| JP | 3-285262 A | 12/1991 | |
| JP | 6-163031 A | 6/1994 | |
| JP | 2000-077059 A | 3/2000 | |
| JP | 2000-268866 A | 9/2000 | |
| JP | 2003-206409 A | 7/2003 | |
| JP | 2003206409 A * | 7/2003 | ............ C08L 101/02 |
| JP | 2004-210980 A | 7/2004 | |
| JP | 2004210980 A * | 7/2004 | ............ C08L 101/00 |
| JP | 2004-247292 A | 9/2004 | |
| JP | 2004247292 A * | 9/2004 | ............ H01M 4/62 |
| JP | 2005-154710 A | 6/2005 | |
| KR | 2006-0098789 A | 9/2002 | |
| WO | WO 2006/093239 A1 | 9/2006 | |
| WO | WO 2008/087845 A1 | 7/2008 | |

OTHER PUBLICATIONS

Korean Intellectual Property Office, Office Action in Korean Patent Application No. 2011-0015038, Aug. 8, 2012.

* cited by examiner

COATING LIQUID, COATING LIQUID FOR MANUFACTURING ELECTRODE PLATE, UNDERCOATING AGENT, AND USE THEREOF

TECHNICAL FIELD

This invention relates to a coating formulation capable of forming a coating of excellent solvent resistance on a metal plate such as an aluminum plate, a coating formulation for manufacturing an electrode plate for a nonaqueous electrolyte secondary battery represented by a lithium ion secondary battery or an electrode plate for a capacitor represented by an electric double layer capacitor (which may hereinafter be called simply "battery") or lithium ion capacitor (which may hereinafter be called simply "capacitor"), an undercoating formulation, the electrode plate, its manufacturing process, the battery, and the capacitor.

BACKGROUND ART

It is a conventional practice to form protective coatings on metal surfaces, such as surfaces of aluminum foils, sheets and plates, to protect them. In recent years, increasing size and weight reductions are under way in electronic equipment and communication equipment, leading to a stronger demand for size and weight reductions on secondary batteries to be employed as drive power supplies in them. To meet these demands, batteries represented by lithium ion secondary batteries having high energy density and high voltage have been proposed as replacements for conventional alkaline batteries.

Concerning electrode plates which considerably affect the performance of secondary batteries, on the other hand, it has been proposed to form them into thinner films of larger areas with a view to providing the secondary batteries with longer charge-discharge cycle life and higher energy density. As disclosed, for example, in Patent Document 1, Patent Document 2, etc., there have been disclosed positive electrode plates each of which is obtainable by adding a dispersion or solution of a conductive aid and a binder in a suitable moistening agent (solvent) to powder of a positive-electrode active material such as a metal oxide, sulfide, halide or the like to prepare a paste-like active material coating formulation, providing a collector made of a metal foil as a substrate, and then applying the coating formulation onto the substrate to form a coating layer (active material layer).

Further, capacitors each of which makes use of an electric double layer formed at an interface between a polarizable electrode plate and an electrolyte are used as backup power supplies for memories, and their application to those requiring a large output such as power supplies for electric cars is now attracting attention. For a large output, it is required to achieve both a high capacitance and a low internal resistance. Electrode plates for these capacitors are generally manufactured by applying a coating formulation, which is a mixture of a binder, an active material, a conductivity-imparting agent and the like, onto collectors and then drying the coating formulation like the above-described negative electrode plates for batteries.

As the binder for use in the above-described coating formulation for the battery or capacitor electrode plate, a fluorinated resin such as a polyfluorinated vinylidene or siliconeacrylic copolymer is used, for example. Negative electrode plates (batteries) and polarizable electrode plates (capacitors) are each obtained by adding a solution of a binder in a suitable moistening agent (solvent) to an active material such as a carbonaceous material to prepare a paste-like coating formulation of the active material and then applying the coating formulation onto a collector. In the above-described coated electrode plates, the binder employed to prepare the active material coating formulation is required to be electrochemically stable to a nonaqueous electrolyte and to be free from dissolution into the electrolyte of the batteries or capacitors, to remain free from swelling by the electrolyte, and further to be soluble in some solvent to permit the coating.

PRIOR ART DOCUMENTS

Patent Documents

Patent Document 1: JP-A-63-010456
Patent Document 2: JP-A-03-285262

SUMMARY OF THE INVENTION

Problem to be Solved by the Invention

The formation of the above-described protective coatings on surfaces of metal materials such as aluminum materials is conducted by applying solutions of various resins. However, the coatings so formed are accompanied by a problem in that their resistance to organic solvents is insufficient, although they are excellent in the adhesion to the metal surfaces.

In a battery or capacitor electrode plate obtained by applying onto a collector the above-described active-material coating formulation that is to be applied onto surfaces of an aluminum foil, copper foil or the like as a collector, the active material layer (coating layer) formed by the coating and drying is accompanied by problems in that its adhesion to the collector and its flexibility are insufficient, its contact resistance to the collector is high, and peeling, flaking, cracking and/or the like of the active material layer takes place during assembly steps of the battery or capacitor or upon charging and discharging the same.

Therefore, a first object of the present invention is to solve the above-described problems of the prior art and to provide a coating formulation capable of forming a coating of excellent adhesion and solvent resistance on a surface of a metal material such as an aluminum material, and a second object of the present invention is to provide a coating formulation for manufacturing an electrode plate for a battery or a polarizable electrode plate for a capacitor, in which an active material layer has excellent adhesion to a collector made of an aluminum foil, copper foil or the like and is also equipped with excellent electrolyte resistance and improved contact resistance to the collector, an undercoating formulation, the electrode plate and its manufacturing process, the battery, and the capacitor.

Means for Solving the Problem

The above-described objects can be achieved by the present invention to be described hereinafter. Described specifically, the present invention provides a coating formulation comprising a polar solvent, and a hydroxyl-containing resin and an organic acid and/or a derivative thereof contained in the polar solvent, wherein the hydroxyl-containing resin is at least one of the following resins (1) to (4):
(1) a polyvinyl acetal resin,
(2) an ethylene-vinyl alcohol copolymer,
(3) a modified and/or unmodified polyvinyl alcohol, and
(4) a cyanoethyl-containing polymer.

It is to be noted that the term "metal" as used herein encompasses aluminum, copper, iron, steel, stainless steel, nickel, titanium, lithium, and the like. It is also to be noted that positive-electrode active materials such as lithium cobaltate, negative-electrode active materials such as graphite, and electrode active materials such as activated carbon in batteries and capacitors may all be called "active materials".

In the above-described coating formulation, the polar solvent may preferably be at least one polar solvent selected from the group consisting of N,N-dimethylformamide, N,N-dimethylacetamide, N-methyl-2-pyrrolidone, N-ethyl-2-pyrrolidone, vinylpyrrolidone, vinyl formamide, vinylacetamide, 1,3-dimethyl-2-imidazolidinone, dimethyl sulfoxide, water, methyl alcohol, ethyl alcohol, propyl alcohol, isopropyl alcohol, butyl alcohol and t-butyl alcohol.

In the above-described coating formulation, (1) the polyvinyl acetal resin may preferably have a polymerization degree of from 300 to 5,000, (2) the ethylene-vinyl alcohol copolymer may preferably have a copolymerized ethylene content of from 10 to 70 mole %, (3) the modified and/or unmodified polyvinyl alcohol may preferably have a polymerization degree of from 300 to 5,000 and a saponification degree of from 30 to 100%, and (4) the cyanoethyl-containing polymer may preferably contain hydroxyl groups and may preferably have a hydroxyl number of from 10 to 1,000 mgKOH/g.

In the above-described coating formulation, (1) the polyvinyl acetal resin may preferably be at least one polyvinyl acetal resin selected from the group consisting of polyvinyl butyral resins, polyvinyl formal resins and polyvinyl acetoacetal resins, (2) the modified polyvinyl alcohol may preferably be at least one modified polyvinyl alcohol selected from the group consisting of carboxyl-modified polyvinyl alcohols, carbonyl-modified polyvinyl alcohols, silanol-modified polyvinyl alcohols, amino-modified polyvinyl alcohols, cation-modified polyvinyl alcohols, sulfonic-modified polyvinyl alcohols and acetoacetyl-modified polyvinyl alcohols, and (3) the cyanoethyl-containing polymer (cyanoethylated polymer) may preferably be at least one cyanoethyl-containing polymer selected from the group consisting of cyanoethylated pullulan, cyanoethylated hydroxyalkylpullulans, cyanoethylated cellulose, cyanoethylated hydroxyalkyl celluloses, cyanoethylated starch, cyanoethylated hydroxyalkyl starches, cyanoethylated chitosan, cyanoethylated hydroxyalkylchitosans, cyanoethylated saccharose, cyanoethylated polyvinyl alcohol and cyanoethyl phenoxy resins.

In the above-described coating formulation, it is preferred that the organic acid is a polybasic acid, and the polybasic acid is selected from the group consisting of 1,2,3-propanetricarboxylic acid, 1,2,4-cyclohexanetricarboxylic acid, 1,2,4,5-cyclohexanetetracarboxylic acid, 1,2,3,4-butanetetracarboxylic acid, trimellitic acid, pyromellitic acid, 1,4,5,8-naphthalenetetracarboxylic acid and 1,2,3,4,5,6-cyclohexanehexacarboxylic acid; that the organic acid and/or the derivative thereof is used in an amount of 1 to 150 parts by weight per 100 parts by weight of the hydroxyl-containing resin; that the coating formulation further comprises an active material to manufacture an electrode plate for a nonaqueous electrolyte secondary battery, an electrode plate for an electrode double layer capacitor or an electrode plate for a lithium ion capacitor; and that the coating formulation further comprises, as a conductive aid, one of acetylene black, Ketjenblack, carbon nanofibers, and other carbon-based conductive aids.

The present invention also provides an electrode plate for a nonaqueous electrolyte secondary battery, an electrode plate for an electrode double layer capacitor or an electrode plate for a lithium ion capacitor, comprising: a collector, and an active material layer formed with an active material and a binder on a surface of the collector, wherein the binder is the above-described hydroxyl-containing resin crosslinked with a polybasic acid and/or a derivative thereof.

The present invention also provides a manufacturing process of an electrode plate for a nonaqueous electrolyte secondary battery, an electrode plate for an electric double layer capacitor or an electrode plate for a lithium ion capacitor, comprising: applying a coating formulation for an electrode on a surface of a collector, drying the coating formulation, and then heating the coating formulation at from 100 to 250° C. for from 1 to 60 minutes to form an active material layer, wherein the coating formulation is the above-described coating formulation according to the present invention. Preferably, the collector can be an aluminum foil, the active material can be a positive-electrode active material, and the electrode plate can be a positive electrode; or the collector can be a copper foil or aluminum foil, the active material can be a negative-electrode active material, and the electrode plate can be a negative electrode. The present invention also provides a nonaqueous electrolyte secondary battery, electric double layer capacitor or lithium ion capacitor comprising the above-described electrode plate.

The present invention also provides an undercoating formulation for manufacturing an electrode plate, comprising the above-described coating formulation according to the present invention with a conductive material contained therein; an electrode plate for a nonaqueous electrolyte secondary battery, an electrode plate for an electric double layer Capacitor or an electrode plate for a lithium ion capacitor, comprising: a collector, an undercoat layer formed with the above-described undercoating formulation on a surface of the collector, and an active material layer formed on the undercoat layer; and a nonaqueous electrolyte secondary battery, electric double layer capacitor or lithium ion capacitor, comprising the above-described electrode plate.

Advantageous Effects of the Invention

According to the present invention, it is possible to provide a coating formulation capable of forming a coating of excellent adhesion and solvent resistance on a surface of a metal material such as an aluminum material. It is also possible to provide a coating formulation and undercoating formulation for manufacturing an electrode plate for a battery or a polarized electrode plate for a capacitor, in which an active material layer is excellent in the adhesion to a collector made of an aluminum foil, copper foil or the like, is excellent in electrolyte resistance, and is also improved in the contact resistance to the collector; the electrode plate, its manufacturing process, the battery, and the capacitor.

MODES FOR CARRYING OUT THE INVENTION

The present invention will next be described in further detail based on preferred embodiments.

[Coating Formulations]

A first coating formulation according to the present invention is characterized in that at least one of the below-described hydroxyl-containing resins (1) to (4) and an organic acid and/or a derivative thereof are contained in a polar solvent, and a second coating formulation according to the present invention is characterized in that an active material for an electrode plate for a battery or capacitor is contained in the first coating formulation.

(1) a polyvinyl acetal resin,
(2) an ethylene-vinyl alcohol copolymer,
(3) a modified and/or unmodified polyvinyl alcohol, and
(4) a cyanoethyl-containing polymer.

Conventionally, a hydroxyl-containing resin such as a polyvinyl acetal resin is known to contain in its molecule hydroxyl groups originated from vinyl alcohol or the like, and to afford a coating having excellent adhesion to a metal material such as aluminum. However, the coating swells, for example, in a polar solvent such as N-methylpyrrolidone, and hence, easily peels off from a surface of the metal material. Further, the use of the hydroxyl-containing resin as a binder in a coating formulation for manufacturing an electrode plate provides the resulting active material layer with excellent adhesion to a collector, but involves a problem in that the active material layer is low in resistance to a battery electrolyte such as ethylene carbonate or propylene carbonate.

The present inventors have conducted an investigation to provide a coating, which is to be formed from a hydroxyl-containing resin, with improved resistance to organic solvents, and as a result, have found that a solution obtainable by adding the hydroxyl-containing resin together with an organic acid and/or a derivative thereof to a specific organic solvent can afford a coating having excellent adhesion to a surface of a metal material and superb solvent resistance. It has also been found that, when an active material layer is formed by using the solution in the organic solvent as a binder for the active material layer, the organic acid and/or the derivative thereof acts as a crosslinking agent for the hydroxyl-containing resin during heating and drying, the coating formed of the hydroxyl-containing resin becomes no longer soluble or swellable in an organic solvent or electrolyte, and therefore, an active material layer having excellent adhesion to a surface of a metal material or a collector and excellent solvent resistance can be formed.

[Polyvinyl Acetal Resin]

The polyvinyl acetal resin for use in the present invention can be synthesized through an acetalization reaction between polyvinyl alcohol and an aldehyde. Described specifically, it can be synthesized by reacting polyvinyl alcohol and the aldehyde in the presence of an acid catalyst such as hydrochloric acid in a solvent such as water, an alcohol or dimethyl sulfoxide (DMSO).

It is to be noted that polyvinyl alcohol is generally obtained by saponifying polyvinyl acetate with an alkali or an acid. A polyvinyl acetal resin can be obtained directly from polyvinyl acetate by conducting saponification and acetalization of the polyvinyl acetate at the same time. As an alternative, subsequent to isolation of polyvinyl alcohol obtained by the saponification of polyvinyl acetate, an aldehyde can be reacted to the polyvinyl alcohol.

As the aldehyde, any aldehyde can be used insofar as it can perform the acetalization. Illustrative are aliphatic aldehydes such as formaldehyde, acetaldehyde, propionaldehyde, n-butyl aldehyde, t-butyl aldehyde, amyl aldehyde, hexyl aldehyde and 2-ethylhexyl aldehyde; alicyclic aldehydes such as cyclohexyl aldehyde and furfural; aromatic aldehydes such as benzaldehyde, alkyl-substituted benzaldehydes, halogen-substituted benzaldehydes and phenyl-substituted alkyl aldehydes; and dialdehydes such as glutaraldehyde. It is to be noted that these aldehydes can be used either singly or in combination.

The preferred polyvinyl acetal resin in the present invention is one having a polymerization degree of from 300 to 5,000, a residual hydroxyl group proportion of from 10 to 50 mole % and a residual acetyl group proportion of from 0 to 15 mole %. As the polyvinyl acetal resin, at least one polyvinyl acetal resin selected from the group consisting of polyvinyl butyral resins, polyvinyl formal resins and polyvinyl acetoacetal resins is particularly preferred. For use in the present invention, these polyvinyl acetal resins are available from the market under trade names such as, for example, "DENKA BUTYRAL #3000-1, #3000-2, #3000-4, #3000-K, #4000-2, #5000-A, #5000-D, #6000-C, #6000-EP, #6000-CS, #6000-AS" (products of Denki Kagaku Kogyo Kabushiki Kaisha), and "S-LEC BM-1, BM-2, BM-5, BM-S, BH-3, BH-6, BH-S" (products of Sekisui Chemical Co., Ltd.) (polyvinyl butyral resins); "VINYLEX K, L, H, E" (products of Chisso Corporation) (polyvinyl formal resins); and "S-LEC KS-1, KS-3, KS-5" (products of Sekisui Chemical Co., Ltd.) (polyvinyl acetoacetal resins).

[Ethylene-Vinyl Alcohol Copolymer]

The ethylene-vinyl alcohol copolymer for use in the present invention is a known resin obtainable by copolymerizing ethylene and vinyl acetate and then conducting post-saponification. Any known ethylene-vinyl alcohol copolymer can be used in the present invention, with one having a copolymerized ethylene content of from 10 to 70 mole % being preferred and one having a copolymerized ethylene content of from 20 to 50 mole % being more preferred. A copolymerized ethylene content smaller than 10 mole % is somewhat inferior in the oxidation resistance of the resulting coating, while a copolymerized ethylene content greater than 70 mole % leads to a reduction in the solubility in a polar solvent and also to a reduction in the adhesion of the resulting coating to the collector. As such ethylene-vinyl alcohol copolymers, those having various copolymerized ethylene contents are available from the market under trade names of "EVAL"® and can be used.

[Modified and/or Unmodified PVA]

The unmodified PVA for use in the present invention is a known resin available by saponifying polyvinyl acetate. Any known unmodified PVA can be used in the present invention, with the use of one having a polymerization degree of from 300 to 5,000 and a saponification degree of from 30 to 100% being preferred. For use in the present invention, such unmodified PVAs of various grades are available from the market under trade names such as "KURARAY POVAL" (product of Kuraray Co., Ltd.), "GOHSENOL" (product of Nippon Synthetic Chemical Industry Co., Ltd.), "DENKA POVAL" (product of Denki Kagaku Kogyo Kabushiki Kaisha", and "J-POVAL" (product of Japan VAM & POVAL Co., Ltd.).

The modified PVA for use in the present invention is one available by introducing functional groups other than hydroxyl groups or acetate groups in the above-described unmodified. PVA. For use in the present invention, a variety of modified PVAs are available from the market, for example, under trade names such as "GOHSERAN" (sulfonic-modified PVA), "GOHSEFIMER K" (cation-modified PVA), "GOHSEFIMER Z" (acetoacetyl-modified PVA), and "GOHSENAL" (carboxyl-modified PVA) (products of Nippon Synthetic Chemical Industry Co., Ltd.); "D POLYMER" (carbonyl-modified PVA) and "A SERIES" (carboxyl-modified PVA) (products of Japan VAM & POVAL Co., Ltd.); and "KURARAY C POLYMER" (cation-modified PVA) (product of Kuraray Co., Ltd.).

[Cyanoethylated Polymer]

Suitably usable as the cyanoethylated polymer for use in the present invention can be cyanoethylated pullulan, cyanoethylated hydroxyethylpullulan, cyanoethylated hydroxypropylpullulan, cyanoethylated dihydroxypropylpullulan, cyanoethylated cellulose, cyanoethylated hydroxyethylcellulose, cyanoethylated hydroxypropylcellulose, cyanoethylated dihydroxypropylcellulose, cyanoethylated starch, cyanoethylated hydroxyethyl starch, cyanoethylated hydroxypropyl starch, cyanoethylated dihydroxypropyl starch, cyanoethylated chitosan, cyanoethylated hydroxyethylchitosan, cyanoethylated hydroxypropylchitosan, cyanoethylated dihydroxypropylchitosan, cyanoethylated saccharose, cyanoethylated polyvinyl alcohol, cyanoethylated phenoxy resins and the like. These polymers may preferably have some hydroxyl groups, for example, hydroxyl numbers of from 10 to 1,000 mgKOH/g, with from 30 to 900 mgKOH/g being preferred.

A hydroxyl number smaller than 10 mgKOH/g results in the formation of a coating with an insufficient crosslink density, and hence, cannot provide the coating with excellent solvent resistance. On the other hand, a hydroxyl number greater than 1,000 mgKOH/g leads to the formation of a coating with reduced adhesion to a surface of a metal material or a collector. Among these cyanoethylated polymers, cyanoethylated polyvinyl alcohol is more preferred from the standpoint of heat resistance. These polymers may be used in combination with one of more cyanoethylated resins the hydroxyl numbers of which are smaller than 10 mgKOH/g, for example, one or more of cyanoethylated pullulan, cyanoethylated dihydroxypropylpullulan, cyanoethylated cellulose, cyanoethylated hydroxyethyl celluloses, cyanoethylated dihydroxypropyl cellulose, cyanoethylated starch, cyanoethylated chitosan, cyanoethylated saccharose, cyanoethylated polyvinyl alcohol, cyanoethylated phenoxy resins, and the like.

As the organic acid or its derivative for use in the present invention, those known to date can each be used, including organic acids such as salicylic acid, hemimellitic acid, trimellitic acid, trimesic acid, mellophanic acid, prehnitic acid, pyromellitic acid, mellitic acid, citric acid, malic acid, tartaric acid, ethylenediamine tetraacetic acid, nitrilotriacetic acid, diethylenetriamine pentaacetic acid, hydroxyethylethylenediamine triacetic acid, methylglycinetriacetic acid, pyrrolidonecarboxylic acid, polymaleic acid, phthalic acid, succinic acid, 1,2,3-propanetricarboxylic acid, 1,2,4-cyclohexanetricarboxylic acid, 1,2,3,4-butanetetracarboxylic acid, 1,2,4,5-cyclohexanetetracarboxylic acid, 1,4,5,8-naphthalenetetracarboxylic acid, and 1,2,3,4,5,6-cyclohexanehexacarboxylic acid.

Preferred can be polybasic acids, their acid anhydrides, and salts of some or all of the carboxyl groups of such polybasic acids, notably their ammonium salts and amine salts and alkyl esters, amides, imides, amide-imides and the like of some or all of the carboxyl groups of such polybasic acids, and derivatives obtained by modifying one or more of the carboxyl groups of these compounds with N-hydroxysuccinimide, N-hydroxysulfosuccinimide or a derivative thereof. Preferred as derivatives of these polybasic acids are compounds which regenerate polybasic acids upon heating of active material layers to be formed subsequently.

From the aspect of the crosslinkability of the hydroxyl-containing resin, 1,2,3-propanetricarboxylic acid, 1,2,4-cylohexanetricarboxylic acid, 1,2,4,5-cyclohexanetetracarboxylic acid, 1,2,3,4-butanetetracarboxylic acid, trimellitic acid, pyromellitic acid, 1,4,5,8-naphthalenetetracarboxylic acid and 1,2,3,4,5,6-cyclohexanehexacarboxylic acid, each of which is a trivalent or higher polybasic acid, and their acid anhydrides are preferred. In the present invention, the organic acid and/or its derivative may be used in an amount of preferably from 1 to 150 parts by weight, more preferably from 2 to 100 parts by weight per 100 parts by weight of the hydroxyl-containing resin. Use of the organic acid and/or its derivative in an amount smaller than 1 parts by weight results in a crosslinked polymer having a lower crosslink density, so that the resulting active material layer is insufficient in the adhesion to a collector and also in the insolubility, non-swellability and electrochemical stability of the crosslinked polymer to an electrolyte. On the other hand, use of the organic acid and/or its derivative in an amount greater than 150 parts by weight leads to the formation of a coating or an active material layer with reduced flexibility, and moreover, is uneconomical.

As the polar solvent for use in the present invention, those known to date can each be used. Examples include ethers (diethyl ether, diisopropyl ether, tetrahydrofuran, 1,2-dioxane, etc.), carbonates (ethylene carbonate, ethyl methyl carbonate, diethyl carbonate, dimethyl carbonate, propylene carbonate, butylene carbonate, etc.), amides (formamide, N-methylformamide, N-ethylformamide, N,N-dimethylformamide, N,N-diethylformamide, vinyl formamide, vinylacetamide, acetamide, N-methylacetamide, N-ethylacetamide, N,N-dimethylacetamide, N,N-diethylacetamide, N-methyl-2-pyrrolidone, N-ethyl-2-pyrrolidone, vinylpyrrolidone, piperidone, N-methylpiperidone, N-ethylpiperidone, hexamethylphosphoric triamide, 1,3-dimethyl-2-imidazolidinone, methyloxazolidinone, ethyloxazolidinone, etc.), sulfoxides (dimethyl sulfoxide, etc.), sulfones (tetramethylene sulfone, etc.), alcohols (methyl alcohol, ethyl alcohol, propyl alcohol, isopropyl alcohol, butyl alcohol, t-butyl alcohol, etc.), water, and the like. Among these, N,N-dimethylformamide, N,N-dimethylacetamide, N-methyl-2-pyrrolidone, N-ethyl-2-pyrrolidone, vinylpyrrolidone, vinyl formamide, vinylacetamide, 1,3-dimethyl-2-imidazolidinone, dimethyl sulfoxide, water, methyl alcohol, ethyl alcohol, propyl alcohol, isopropyl alcohol, butyl alcohol and t-butyl alcohol are more preferred. These polar solvents may be used either singly or in combination.

As the organic acid and/or its derivative and polar solvent for use in the present invention, general commercial products can be used as they are, or they may be used after purification as needed.

As the order of addition of the hydroxyl-containing resin and the organic acid and/or its derivative to the polar solvent upon their dissolution in the solvent to prepare the coating formulation for use in the present invention, either the hydroxyl-containing resin or the organic acid and/or its derivative may be added first or they may be added at the same time. As their dissolution method, stirring may be conducted with heating as needed although stirring at room temperature is sufficient.

The concentration of the polymer in the coating formulation according to the present invention may range preferably from 1 to 40 wt %, more preferably from 5 to 10 wt % from the viewpoints of coating applicability, transport cost and the like. A concentration lower than 1 wt % makes it difficult to obtain a stable coating or active material layer, and moreover, is disadvantageous in transport cost, while a concentration higher than 40 wt % makes it hard to obtain a homogeneous solution.

[Application to Electrode Plate and Battery]

By adding an active material to the coating formulation according to the present invention, the resultant coating formulation is useful as a coating formulation for an electrode plate of a battery or the like. As a positive-electrode active material among the active materials usable in the coating formulation according to the present invention, it is possible to use, for example, one or a combination of plural ones of lithium oxides such as $LiCoO_2$, $LiNiO_2$ and $LiMn_2O_4$, lithium-containing, Ni—Co—Mn ternary composite oxides, phosphoric acid compounds having the olivine structure such as iron lithium phosphate ($LiFePO_4$), and chalcogen compounds such as $TiS_2$, $MnO_2$, $MoO_3$ and $V_2O_5$. As a negative-electrode active material, on the other hand, metal lithium, a lithium alloy, a lithium titanium oxide such as lithium titanate, a carbonaceous material such as graphite, carbon black or acetylene black, or a material that intercalates lithium ions can be used preferably. In the present invention, it is preferred to use a conductive aid in combination with the above-described active material. Usable examples of the conductive aid include acetylene black, Ketjenblack, carbon nanofibers, and other carbonaceous conductive aids, with the use of acetylene black being particularly preferred.

The electrode-plate coating formulation according to the present invention can be obtained by adding the active material and, if necessary, the conductive aid to the solution of the hydroxyl-containing resin and the organic acid and/or its derivative in the organic solvent and then kneading the resultant mixture. The proportions of the respective components in the coating formulation may preferably be from 1 to 10 parts by weight of the hydroxyl-containing resin, from 0.01 to 20 parts by weight of the organic acid and/or its derivative, and from 1 to 15 parts by weight of the conductive aid (when used), when the active material is assumed to amount to 100 parts by weight. Further, the solid content of the coating formulation may preferably range from 10 to 80 wt %.

If the hydroxyl-containing resin is used in an amount smaller than 1 parts by weight in the foregoing, the resulting active material layer may be provided with insufficient strength and insufficient adhesion to a collector. If the polymer is used in an amount greater than 10 parts by weight, on the other hand, the resulting active material layer may be provided with reduced electrical conductivity.

If the organic acid and/or its derivative is used in an amount smaller than 0.01 parts by weight, the resulting active material layer may be provided with insufficient strength, insufficient adhesion to a collector, and insufficient electrochemical stability to an electrolyte. If the organic acid and/or its derivative is used in an amount greater than 20 wt %, on the other hand, the resulting active material layer may be provided with reduced flexibility.

When the conductive aid is used although its use is not essential, the use of the conductive aid in an amount smaller than 1 parts by weight may provide the resulting active material layer with insufficient electrical conductivity. If the conductive aid is used in an amount greater than 15 parts by weight, on the other hand, the remaining components may become insufficient so that the resulting active material layer may be provided with reduced performance.

The coating formulation according to the present invention may further contain optional components other than the above-described components, for example, other crosslinking agents and the like. Examples of such other crosslinking agents include epoxy compounds such as ethylene glycol diglycidyl ether, polyethylene glycol diglycidyl ether and glycerol polyglycidyl ether; isocyanate compounds such as toluylene diisocyanate, xylylene diisocyanate, hexamethylene diisocyanate and phenyl diisocyanate, and blocked isocyanate compounds formed by blocking such isocyanate compounds with blocking agents such as phenols, alcohols, active methylenes, mercaptans, acid-amides, imides, amines, imidazoles, ureas, carbamic acids, imines, oximes or sulfites; and aldehyde compounds such as glyoxal, glutaraldehyde, and dialdehyde starch.

Also included are (meth)acrylate compounds such as polyethylene glycol diacrylate, polyethylene glycol dimethacrylate and hexanediol diacrylates; methylol compounds such as methylolmelamine and dimethylol urea; organic acid metal salts such as zirconyl acetate, zirconyl carbonate and titanium lactate; and metal alkoxide compounds such as aluminum trimethoxide, aluminum tributoxide, titanium tetraethoxide, titanium tetrabutoxide, zirconium tetrabutoxide, aluminum dipropoxide acethylacetonate, titanium dimethoxide bis (acetylacetonate) and titanium dibutoxide bis(ethylacetoacetate).

Further included are silane coupling agents such as vinylmethoxysilane, vinylethoxysilane, 3-glycidoxypropyltrimethoxysilane, 3-glycidoxypropyltriethoxysilane, 3-methacryloxypropyltrimethoxysilane, 3-aminopropyltrimethoxysilane, 3-aminopropyltriethoxysilane, 3-isocyanatopropyltriethoxysilane and imidazolesilane; silane compounds such as methyltrimethoxysilane, tetraethoxysilane and methyltriethoxysilane; carbodiimide compounds; and the like. The use of such a crosslinking agent is not essential. When employed, however, the amount of the crosslinking agent may suitably range from 0.01 to 200 wt % based on the hydroxyl-containing resin.

A description will be made about a specific process for the preparation of the electrode-plate coating formulation according to the present invention. Firstly, a powdery active material, which is selected as desired from materials such as those mentioned above, and if necessary, a powdery conductive aid are added to the coating formulation containing the hydroxyl-containing resin and the organic acid and/or its derivative such that they are contained in the above-described proportions. Using a conventionally-known disperser such as a homogenizer, ball mill, sand mill or roll mill or a conventionally-known kneader such as a planetary mixer, the resultant mixture is mixed and dispersed to prepare the electrode-plate coating formulation according to the present invention.

The electrode-plate manufacturing process according to the present invention is characterized by the use of the above-described electrode-plate coating formulation according to the present invention. Examples of the collector for use in the manufacture of the electrode plate include, as positive electrode collectors, aluminum, tantalum, niobium, titanium, hafnium, zirconium, zinc, tungsten, bismuth and antimony; and as negative electrode collectors, metal foils such as a copper foil. As the positive electrode collector, aluminum is preferred for its excellent corrosion resistance to an electrolyte, its light weight, and its easy machine workability. As the thickness of the metal foil, a metal foil of from 10 to 30 μm or so can be used. These collectors may be treated beforehand at surfaces thereof with a coupling agent such as a silane-based, titanate-based or aluminum-based coupling agent.

The electrode plate can be obtained by applying the electrode-plate coating formulation onto the surface of the collector to a dry thickness in a range of from 10 to 200 μm, preferably from 50 to 180 μm by using one of various coating methods such as gravure coating, gravure reverse coating, roll coating, Meyer bar coating, blade coating, knife coating, air knife coating, comma coating, slot die coating, slide die coating or dip coating, and then drying the thus-applied coating formulation under heat.

Upon drying under heat, the coating can be heated preferably at 100° C. or higher for 1 second or longer, more preferably at from 100 to 250° C. for from 1 second to 60 minutes so that the hydroxyl-containing resin (binder) can be fully cross linked to provide the resulting active material layer with improved adhesion to the collector and also to provide the binder with improved electrochemical stability to an electrolyte. Heat treatment conditions of lower than 100° C. or shorter than 1 second may fail to provide the active material layer with sufficient adhesion to the collector and also to provide the binder with satisfactory electrochemical stability to the electrolyte.

To provide the active material layer, which is to be formed by conducting coating and heat treatment as described above, with further improved uniformity, it is also preferred to form the electrode plate according to the present invention by applying pressing processing to the active material layer while using metal rolls, heating rolls, a sheet press or the like. As pressing conditions for the pressing processing, a press pressure lower than 500 kgf/cm$^2$ can hardly provide the active material layer with uniformity, while a press pressure higher than 7,500 kgf/cm$^2$ breaks the electrode plate itself including the collector. As the pressing conditions, a range of from 500 to 7,500 kgf/cm$^2$ is therefore preferred.

The electrode plate obtained as described above has, on the surface of the collector, the active material layer formed of the active material and the hydroxyl-containing resin (binder) crosslinked by the organic acid, especially the polybasic acid, and the active material layer has such properties as described above.

When manufacturing a non-aqueous electrolyte secondary battery, for example, a lithium-based secondary battery by using the positive electrode plate and negative electrode plate of the present invention produced as described above, a nonaqueous electrolyte with a lithium salt dissolved as a solute in an organic solvent or ionic liquid is used as an electrolyte. Usable examples of the lithium salt as the solute that forms the nonaqueous electrolyte include inorganic lithium salts such as $LiClO_4$, $LiBF_4$, $LiPF_6$, $LiAsF_6$, $LiCl$ and $LiBr$; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$ and $LiOSO_2C_7F_{15}$.

As the organic solvent employed upon formation of the nonaqueous electrolyte, a cyclic ester, a linear ester, a cyclic ether, a linear ether or the like can be mentioned. Illustrative of the cyclic ester are ethylene carbonate, propylene carbonate, butylene carbonate, γ-butyrolactone, vinylene carbonate, 2-methyl-γ-butyrolactone, acetyl-γ-butyrolactone, and γ-valerolactone.

Illustrative of the linear ester are dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates.

Illustrative of the cyclic ether are tetrahydrofuran, alkyltetrahydrofurans, dialkylalkyltetrahydrofurans, alkoxytetrahydrofurans, dialkoxytetrahydrofurans, 1,3-dioxolane, alkyl-1,3-dioxolanes, and 1,4-dioxolane. Illustrative of the linear ether are 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

The ionic liquid is a liquid formed solely of ions which are composed of a combination of organic cations and anions. The organic cations can be, for example, at least one kind of ions selected from the group consisting of dialkylimidazolium cations such as 1-ethyl-3-methylimidazolium ions, trialkylimidazolium cations such as 1,2-dimethyl-3-propylimidazolium ions, tetraalkylammonium ions such as dimethylethylmethoxyammonium ions, alkylpyridinium ions such as 1-butylpyridinium ions, dialkylpyrrolidiniuim ions such as methylpropylpyrrolidinium ions, and dialkylpiperidinium ions such as methylpropylpiperidinium ions.

As anions to be paired with these organic cations, $AlCl_4^-$, $PF_6^-$, $PF_3(C_2F_5)_3^-$, $PF_3(CF_3)_3^-$, $BF_4^-$, $BF_2(CF_3)_2^-$, $BF_3(CF_3)^-$, $CF_3SO_3^-$ (TfO: triflate anions) $(CF_3SO_2)_2N^-$ (TFSI: trifluoromethanesulfonyl), $(FSO_2)_2N^-$ (FSI: fluorosulfonyl), $(CF_3SO_2)_3C^-$ (TFSM) and the like can be used. It is to be noted that the remaining construction of the battery is similar to those of conventional technologies.

[Application to Electrode Plate for Capacitor (Electrode Double Layer Capacitor or Lithium Ion Capacitor) and Capacitor (Electrode Double Layer Capacitor or Lithium Ion Capacitor)]

A description will hereinafter be made of a case that the electrode-plate coating formulation according to the present invention is applied to the manufacture of a capacitor electrode plate and a capacitor. The coating formulation for the capacitor electrode plate contains the solution of the above-described hydroxyl-containing resin and the above-described organic acid and active material, and if necessary, also contains a conductive aid.

The active material for use in the capacitor can be a carbonaceous material having a specific surface area of preferably 30 m$^2$/g or greater, more preferably from 500 to 5,000 m$^2$/g, still more preferably from 1,000 to 3,000 m$^2$/g, and powder or fibers such as activated carbon, polyacetylene, carbon whiskers, carbon nanotubes or graphite can be used. The active material may preferably be activated carbon. As the activated carbon, phenol-based, rayon-based, acrylic, pitch-based or coconut shell activated carbon can be used. It is also possible to use, as the active material, nonporous carbon having graphite-like microcrystalline carbon atoms and an increased interlayer distance between the microcrystalline carbon atoms and disclosed, for example, in JP-A-11-317333 or JP-A-2002-025867. The particle size of the active material may range preferably from 0.1 to 100 μm, more preferably from 1 to 20 μm, because this particle size range facilitates the formation of the active material layer as a thin coating for the capacitor electrode plate and also provides the active material layer with a higher capacity density.

The amount of the hydroxyl-containing resin in the capacitor-electrode coating formulation may range preferably from 0.1 to 20 parts by weight, more preferably from 0.5 to 10 parts by weight in terms of solid content per 100 parts by weight of the active material. An unduly small amount of the hydroxyl-containing resin makes the active material and conductive aid tend to fall off from the electrode, while an excessively large amount of the hydroxyl-containing resin covers the active material under the hydroxyl-containing resin and therefore has a potential problem in that the internal resistance of the electrode plate may increase.

The capacitor-electrode coating formulation may preferably contain a conductive aid. As the conductive aid, conductive carbon such as acetylene black, Ketjenblack or carbon black can be used. Such conductive carbon is used as a mixture with the active material. The combined use of the conductive aid can further improve the electrical contact of the active material itself, and can provide the capacitor with reduced internal resistance and a higher capacity density. The conductive aid may be used in an amount of generally from 0.1 to 20 parts by weight, preferably from 2 to 10 parts by weight per 100 parts by weight of the active material.

The capacitor-electrode coating formulation can be produced by mixing the hydroxyl-containing resin solution, the active material and, if necessary, the conductive aid in a mixer. As the mixer, a ball mill, sand mill, pigment disperser, mix-muller, ultrasonic disperser, homogenizer, planetary mixer, Hobart mixer, or the like can be used. Also preferred is a method that firstly mixes the active material and the conductive aid in a mixer such as a mix-muller, planetary mixer, Henschel mixer or omni-mixer homogenizer, adds the hydroxyl-containing resin solution, and then mixes them into a uniform mixture. Adoption of this method makes it possible to readily obtain a uniform coating formulation.

The capacitor electrode plate according to the present invention is obtained by applying the coating formulation, which contains the hydroxyl-containing resin solution, the organic acid and the electrode active material and, if necessary, the conductive aid, onto a collector and then drying the coating formulation to form an active material layer. As the collector, a material having electrical conductivity and electrochemical durability can be used. From the viewpoint of the possession of heat resistance, a metal material such as aluminum, titanium, tantalum, stainless steel, gold or platinum is preferred, with aluminum or platinum being particularly preferred. No particular limitation is imposed on the shape of the collector. In general, however, a sheet-shaped collector having a thickness of from 0.001 to 0.5 mm or so can be employed.

No particular limitation is imposed on the forming method of the active material layer for the capacitor. Preferred is a method that applies the capacitor-electrode coating formulation onto a collector and then dries the coating formulation to form an active material layer on the collector. As an application method of the coating formulation onto the collector, a method such as doctor blade coating, dip coating, reverse roll coating, direct roll coating, gravure coating, extrusion, brush coating or spray coating can be mentioned.

The viscosity of the coating formulation for the capacitor electrode plate may be generally from 100 to 100,000 mPa·s, preferably from 1,000 to 50,000 mPa·s, more preferably 5,000 to 20,000 mPa·s, although it differs depending on the type of the coating machine and the layout of the coating line. No particular limitation is imposed on the amount of the coating formulation for the capacitor electrode plate to be applied. In general, however, the coating formulation may be applied in such an amount that the active material layer to be formed subsequent to the elimination of the solvent by drying will have a thickness of usually from 0.005 to 5 mm, preferably from 0.01 to 0.3 mm. The drying method and drying conditions for the coating layer are similar to those described above in connection with the battery electrode plate.

The capacitor according to the present invention, which has the above-described electrode plate, can be manufactured in a usual manner by using parts such as the electrode plates, the electrolyte and a separator. Described specifically, it can be manufactured, for example, by stacking the electrode plates together with the separator interposed therebetween, rolling or folding the resultant stack into a form conforming to the shape of the capacitor, placing the rolled or folded stack in a can, filling the electrolyte into the can, and sealing the can.

The electrolyte may preferably be, but is not limited particularly to, a nonaqueous electrolyte with an electrolyte dissolved in an organic solvent. As the electrolyte for an electric double layer capacitor, for example, any electrolyte known to date can be used. Illustrative are tetraethylammonium tetrafluoroborate, triethylmonomethylammonium tetrafluoroborate, tetraethylammonium hexafluorophosphate, and the like. As the electrolyte for a lithium ion capacitor, a lithium salt such as LiI, $LiClO_4$, $LiAsF_6$, $LiBF_4$ or $LiPF_6$ can be mentioned.

No particular limitation is imposed on the solvent (electrolyte solvent) for dissolving such an electrolyte, insofar as it is commonly employed as an electrolyte solvent. Specific examples include carbonates such as propylene carbonate, ethylene carbonate and butylene carbonate; lactones such as γ-butyrolactone; sulfolanes; and nitriles such as acetonitrile. They can be used either singly or in combination. Among these, carbonates are preferred for their high withstand voltage. The concentration of the electrolyte may be generally 0.5 mole/L or higher, preferably 0.8 mole/L or higher.

As the separator, a known separator can be used such as a microporous membrane or nonwoven fabric made of a polyolefin such as polyethylene or polypropylene; or a porous membrane made of pulp as a principal raw material and generally called "electrolytic capacitor paper". A separator may also be formed by dispersing inorganic ceramic powder and a binder in a solvent, coating the resultant dispersion onto an active material layer, and then drying the coating. A solid electrolyte or gel electrolyte may also be used instead of such a separator. As other materials such as a can, those employed in usual capacitors are all usable.

[Undercoating Formulation]

The undercoating formulation according to the present invention is characterized in that it is obtainable by adding a conductive material to the solution of the hydroxyl-containing resin and kneading the resultant mixture. The solution of the hydroxyl-containing resin for use in the undercoating formulation is the same as that mentioned above under the [Coating formulation]. Further, the conductive material is the same as the conductive aid mentioned above under the [Application to battery electrode plate and battery]. The amount of the conductive material to be added to the solution of the hydroxyl-containing resin and the method for applying the undercoating formulation onto a collector or substrate are the same as those described above.

The conventional batteries and capacitors are each accompanied by the problems mentioned above under the Background Art, specifically the problems of the poor adhesion between the active material layer and the collector (substrate) and the high resistance between the active material layer and the substrate. To solve these problems, a variety of undercoating formulations (primers) have been proposed. The adhesion problem has been solved by an undercoat layer formed from such an undercoating formulation, but due to the undercoat layer, the resistance between the active material layer and the collector has become still higher, thereby failing to solve the problem.

The present inventors have found that the adhesion between the active material layer and the collector can be significantly improved, while lowering the resistance between the active material layer and the collector rather than increasing it at all, by applying the undercoating formulation of the present invention onto a surface of a collector to a thickness of from 0.2 to 100 μm, preferably from 0.5 to 50 μm in terms of solid content to form an undercoat layer, and forming a layer of a positive-electrode active material, a layer of a negative-electrode active material or a layer of a capacitor active material on the undercoat layer.

Accordingly, the present invention provides a battery electrode plate or capacitor electrode plate characterized in that an undercoat layer is formed from the undercoating formulation and an active material layer is formed on the undercoat layer; and also, a battery or capacitor characterized by having such electrode plates.

It is to be noted that the binder, which forms the active material layer or electrode layer on the electrode plate, may be the above-described solution of the hydroxyl-containing resin or as an alternative, a conventionally-known binder, for example, a known binder such as polyfluorinated vinylidene, polytetrafluoroethylene, an acrylic resin, a polyimide resin, a polyamide-imide resin, a silicone-acrylic resin or a styrene-butadiene copolymer rubber. Especially with the above-described known binders, it has heretofore been essential to chemically treat, for example, a surface of an aluminum foil to bring about improved adhesion between the electrode layer and the collector. The use of the undercoating formulation according to the present invention can obviate such cumbersome and costly, chemical treatment and can realize still better adhesion and lower resistance. It is, therefore, possible to provide a battery and capacitor of high efficiency and high service life.

EXAMPLES

The present invention will next be described more specifically based on examples and comparative examples. It should, however, be borne in mind that the present invention shall not be limited by these examples. It is to be noted that all designations of "parts" or "%" in the following examples and comparative examples are on a weight basis unless otherwise specifically indicated.

Examples (I)

Making Use of Polyvinyl Acetal Resins

<Preparation of Polyvinyl Acetal Resin Solutions> mole %, polymerization degree: about 1,000)] was dispersed. After pyromellitic acid (2 parts) was added to the dispersion, the resulting mixture was stirred at 50° C. for 2 hours to prepare a polyvinyl butyral resin solution (100 parts).

Samples I-2 to I-13

Polyvinyl acetal resin solutions according to the present invention were prepared by a similar procedure as in Sample I-1 except that the kind, residual hydroxyl group proportion, residual acetyl group proportion, polymerization degree and/or amount of the polyvinyl acetal resin, the kind and/or amount of the polybasic acid, the mixing ratio of the polyvinyl acetal resin to the polybasic acid, and/or the kind and/or amount of the polar solvent were changed as shown in Table I-1.

TABLE I-1

Polyvinyl Acetal Resin Solutions

| | Polyvinyl acetal resins | | | | | Polybasic acids | | Polar solvents | |
|---|---|---|---|---|---|---|---|---|---|
| Samples | Kind | Prop. of residual hydroxyl groups (mole %) | Prop. of residual acetyl groups (mole %) | Polymerization degree | Parts | Kind | Parts | Kind | Parts |
| I-1 | PVB | 19 | 1 | 1,000 | 5 | Pyromellitic acid | 2 | NMP | 93 |
| I-2 | PVB | 19 | 1 | 600 | 8 | Pyromellitic acid | 3 | NMP | 89 |
| I-3 | PVB | 16 | 1 | 2,000 | 4 | Pyromellitic acid | 1 | NMP | 95 |
| I-4 | PVB | 16 | 2 | 2,000 | 5 | Pyromellitic anhydride | 1 | NMP | 94 |
| I-5 | PVB | 12 | 7 | 800 | 6 | Trimellitic acid | 1 | NMP | 93 |
| I-6 | PVB | 13 | 13 | 2,400 | 5 | Trimellitic anhydride | 2 | NMP | 93 |
| I-7 | PVB | 11 | 1 | 2,400 | 4 | BTC | 0.5 | NMP | 95.5 |
| I-8 | PVB | 34 | 2 | 2,000 | 5 | NTC | 3 | NEP | 92 |
| I-9 | PVB | 22 | 5 | 1,000 | 5 | Pyromellitic acid | 2 | DMP | 93 |
| I-10 | PVB | 30 | 1 | 1,700 | 5 | Pyromellitic acid | 2 | DMSO | 93 |
| I-11 | PVF | 18 | 2 | 2,000 | 5 | Pyromellitic acid | 1.5 | DMAc | 93.5 |
| I-12 | PVAcA | 25 | 1 | 3,500 | 2 | Pyromellitic acid | 1 | DMI | 97 |
| I-13 | PVB | 19 | 1 | 1,000 | 5 | — | — | NMP | 95 |

PVB: polyvinyl butyral
PVF: polyvinyl formal
PVAcA: polyvinyl acetoacetal
BTC: 1,2,3,4-butanetetracarboxylic acid
NTC: 1,4,5,8-naphthalenetetracarboxylic acid The compositions of individual polyvinyl acetal resin solutions employed in examples and comparative examples are shown in Table I-1. Concerning polar solvents used in the respective polyvinyl acetal resin solutions, the following abbreviations will be used: NMP (N-methyl-2-pyrrolidone), NEP (N-ethyl-2-pyrrolidone), DMF (N,N-dimethylformamide), DMSO (dimethylsulfoxide), DMAc (N,N-dimethylacetamide), and DMI (1,3-dimethyl-2-imidazolidinone).

Sample I-1

In NMP (93 parts), a polyvinyl butyral resin [5 parts; product of Denki Kagaku Kogyo Kabushiki Kaisha, "DENKA BUTYRAL #4000-2" (proportion of residual hydroxyl groups: 19 mole %, proportion of residual acetyl groups: 1

Application to Batteries

Example I-1

Coating Formulation, Electrode Plate

A positive-electrode coating formulation employed in this example and containing a positive-electrode active material was prepared by a procedure to be described hereinafter. As materials for the positive-electrode coating formulation, $LiCoO_2$ powder having particle sizes of from 1 to 100 μm, acetylene black as a conductive aid and the solution of Sample I-1 (as a binder) described above in Table I-1 were stirred and mixed at a mixing ratio of 90 parts, 5 parts and 60 parts at a rotation speed of 60 rpm for 120 minutes in a planetary mixer to obtain a slurry-form, positive-electrode coating formulation with the positive-electrode active material contained therein.

Using the positive-electrode coating formulation obtained as described above and employing, as a substrate, a collector material formed of a 20-μm thick aluminum foil, the positive-electrode coating formulation was applied onto one side of the substrate by a comma roll coater. The thus-coated substrate was then dried for 2 minutes in an oven controlled at 110° C., and was further dried for 2 minutes in the oven controlled at 180° C. to eliminate the solvent and to crosslink the binder, so that a positive electrode plate with an active material layer formed with a dry thickness of 100 μm on the collector material was obtained. The positive electrode plate obtained by the above-described procedure was pressed under conditions of 5,000 kgf/cm$^2$ to make the active material layer uniform. Subsequently, aging was conducted for 48 hours in a vacuum oven controlled at 80° C. to fully eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer of one of specimens cut from the positive electrode plate to form 100 squares within 1 cm$^2$. A mending tape was applied to the surface of the active material layer, and tape peeling was then conducted. The number of squares which did not peel off was determined as a measure of adhesion. The average of 10 tests was 98.0 squares. Further, after another one of the specimens, said another specimen being provided with squares formed thereon in a similar manner as described above, was immersed at 50° C. for 24 hours in a mixed solvent of EC (ethylene carbonate), PC (propylene carbonate) and DME (dimethoxyethane) combined together at a volume ratio of 1:1:2, conditions of its active material layer were observed. One developed no changes is indicated as "not observed" under "solubility/swellability", while one with its active material layer having peeled or swollen is indicated as "observed" under "solubility/swellability".

To evaluate the oxidation resistance of the active material layer (binder), a still further specimen (2 cm×3 cm) cut from the positive electrode plate was immersed in a 6% aqueous solution of hydrogen peroxide, and was then subjected to heat treatment (80° C.×3 hours). Conditions of the active material layer after the heat treatment were observed. One developed no changes is indicated as "observed" under "oxidation resistance", while one with its active material layer having peeled is indicated as "not observed" under "oxidation resistance".

Examples I-2 to I-12 & Comparative Examples I-1 to I-3

Coating Formulations and Electrode Plates

Positive electrode plates were produced as in Example I-1 except that the polyvinyl acetal resin solutions described below in Table I-2 were used in place of the polyvinyl acetal resin solution in Example I-1. Specimens cut from each positive electrode plate were tested for the adhesion of the active material layer to the collector and the solubility/swellability and oxidation resistance of the active material layer, respectively, as in Example I-1. The results described below in Table I-2 were obtained. It is to be noted that a 5% solution of polyvinylidene fluoride (PVDF solution) in NMP was used in Comparative Example I-2, and also that a styrene-butadiene copolymer latex (with sodium carboxymethylcellulose used as a thickening agent) was used in Comparative Example I-3.

TABLE I-2

| Exs./ Comp. Exs. | Polyvinyl acetal resin solutions | Amount of polyvinyl acetal resin solution used per 100 parts of active material (parts; solid content) | Adhesion (average value) | Solubility/ swellability | Oxidation resistance |
| --- | --- | --- | --- | --- | --- |
| Ex. I-1 | Sample I-1 | 3 | 98 | Not observed | Observed |
| Ex. I-2 | Sample I-2 | 5 | 94 | Not observed | Observed |
| Ex. I-3 | Sample I-3 | 4 | 97 | Not observed | Observed |
| Ex. I-4 | Sample I-4 | 6 | 99 | Not observed | Observed |
| Ex. I-5 | Sample I-5 | 5 | 97 | Not observed | Observed |
| Ex. I-6 | Sample I-6 | 4 | 95 | Not observed | Observed |
| Ex. I-7 | Sample I-7 | 5 | 97 | Not observed | Observed |
| Ex. I-8 | Sample I-8 | 4 | 93 | Not observed | Observed |
| Ex. I-9 | Sample I-9 | 5 | 98 | Not observed | Observed |
| Ex. I-10 | Sample I-10 | 4 | 99 | Not observed | Observed |
| Ex. I-11 | Sample I-11 | 5 | 96 | Not observed | Observed |
| Ex. I-12 | Sample I-12 | 5 | 95 | Not observed | Observed |
| Comp. Ex. I-1 | Sample I-13 | 5 | 64 | Observed | Observed |
| Comp. Ex. I-2 | PVDF soln. | 5 | 37 | Not observed | Observed |
| Comp. Ex. I-3 | SBR + CMC dispn. | 3 | 95 | Observed | Not observed |

SBR: styrene-butadiene copolymer latex (product of Nippon A&L Inc., "NALSTAR-SR-112")
CMC: sodium carboxymethylcellulose (product of Nippon Paper Chemical Co., Ltd., "SUNROSE F-600LC")

Example I-13

Coating Formulation, Electrode Plate

A negative-electrode coating formulation employed in this example and containing a negative-electrode active material was prepared by a procedure to be described next. Carbon powder obtained by thermal degradation of coal coke at 1,200° C., acetylene black as a conductive aid and the solution of Sample I-8 described above in Table I-1 were stirred and mixed at a mixing ratio of 90 parts, 5 parts and 80 parts at a rotation speed of 60 rpm for 120 minutes in the planetary mixer to obtain a slurry-form coating formulation with the negative-electrode active material contained therein.

The coating formulation containing the negative-electrode active material and obtained as described above was applied onto a copper-foil collector material by using the comma roll coater. After the thus-coated collector material was processed through a drying step, it was dried for 2 minutes in the oven controlled at 110° C., and was further dried for 2 minutes in the oven controlled at 180° C. to eliminate the solvent and to crosslink the binder, so that an active material layer was formed with a dry thickness of 100 μm on the collector material. A negative electrode plate obtained by the above-described procedure was pressed under the conditions of 5,000 kgf/cm² to make the active material layer uniform. Subsequently, aging was conducted for 48 hours in the vacuum oven controlled at 80° C. to fully eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer of one of specimens cut from the negative electrode plate to form 100 squares within 1 cm². A mending tape was applied to the surface of the active material layer, and tape peeling was then conducted. The number of squares which did not peel off was determined as a measure of adhesion. The average of 10 tests was 99 squares. The solubility/swellability of the active material layer was also evaluated as in Example I-1.

Examples I-14 to I-24 & Comparative Examples I-4 to I-5

Coating Formulations and Electrode Plates

Negative electrode plates were produced as in Example I-13 except that the polyvinyl acetal resin solutions described below in Table I-3 were used in place of the polyvinyl acetal resin solution in Example I-13. Specimens cut from each negative electrode plate were tested for the adhesion of the active material layer to the collector and the solubility/swellability of the active material layer, respectively, as in Example I-13. The results described below in Table I-3 were obtained. It is to be noted that a 5% solution of polyvinylidene fluoride (PVDF solution) in NMP was used in Comparative Example I-5.

(polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a battery of the AA size and 500 mAh rated capacity was assembled. Charged as an electrolyte into the battery was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of battery characteristics, a charge-discharge measuring instrument was used. Twenty (20) batteries were charged all together at the temperature condition of 25° C. and the current value of a 0.2 CA charging current, firstly in a charging direction until a battery voltage reached 4.1 V. After a break of 10 minutes, the batteries were discharged at the same current until 2.75 V was reached. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle was 97. With the batteries making use of the positive electrode plates of Examples I-2 to I-12 and the negative electrode plates of Examples I-14 to I-24, excellent results similar to those obtained above were also obtained.

Application to Capacitors

Example I-1

Capacitor

The polyvinyl acetal resin solution of Sample I-1 (5 parts in terms of solid content), high-purity activated carbon powder (specific surface area: 1,500 m²/g, average particle size: 10

TABLE I-3

| Exs./Comp. Exs. | Polyvinyl acetal resin solutions | Amount of polyvinyl acetal resin solution used per 100 parts of active material (parts; solid content) | Adhesion (average value) | Solubility/ swellability |
|---|---|---|---|---|
| Ex. I-13 | Sample I-8 | 4 | 99 | Not observed |
| Ex. I-14 | Sample I-1 | 5 | 99 | Not observed |
| Ex. I-15 | Sample I-2 | 3 | 93 | Not observed |
| Ex. I-16 | Sample I-3 | 5 | 98 | Not observed |
| Ex. I-17 | Sample I-4 | 5 | 97 | Not observed |
| Ex. I-18 | Sample I-5 | 7 | 98 | Not observed |
| Ex. I-19 | Sample I-6 | 3 | 92 | Not observed |
| Ex. I-20 | Sample I-7 | 4 | 94 | Not observed |
| Ex. I-21 | Sample I-9 | 5 | 98 | Not observed |
| Ex. I-22 | Sample I-10 | 2 | 91 | Not observed |
| Ex. I-23 | Sample I-11 | 5 | 97 | Not observed |
| Ex. I-24 | Sample I-12 | 5 | 96 | Not observed |
| Comp. Ex. I-4 | Sample I-13 | 5 | 65 | Not observed |
| Comp. Ex. I-5 | PVDF soln. | 5 | 39 | Not observed |

Example I-25

Battery

An electrode unit was first constructed by using the positive electrode plate obtained above in Example I-1 and the negative electrode plate obtained above in Example I-13, and rolling them into a volute form with a separator interposed therebetween. The separator was made of a porous polyolefin μm; 100 parts as an active material and acetylene black (4 parts) as a conductive aid were charged in the planetary mixer, and NMP was added to give a total solid concentration of 45%, followed by mixing for 60 minutes. Subsequently, the mixture was diluted with NMP to a solid concentration of 42%, followed by further mixing for 10 minutes to obtain a capacitor coating formulation. Using a doctor blade, the coating formulation was applied onto a 20-μm thick aluminum foil, followed by drying at 80° C. for 30 minutes in a fan dryer.

Using the roll press, pressing was then conducted to obtain a capacitor electrode plate having a thickness of 80 μm and a density of 0.6 g/cm$^3$. Specimens cut from the electrode plate were tested for its adhesion to the collector and its solubility/swellability in the solvent, respectively, as in Example I-1 of the [Application to batteries]. The results are shown in Table I-4.

Two specimens were provided by cutting out two discs of 15 mm in diameter from the electrode plate produced as described above, and were then dried at 200° C. for 20 hours. Those two specimens were arranged with their electrode layer sides opposing each other, and a cellulose-made, disc-shaped separator of 18 mm in diameter and 40 μm in thickness was held between the specimens. The thus-obtained electrode unit was placed in a coin-shaped package made of stainless steel (diameter: 20 mm, height: 1.8 mm, stainless steel thickness: 0.25 mm) and equipped with a polypropylene-made packing. An electrolyte was charged into the can such that no air was allowed to remain. A 0.2-mm thick stainless steel cap was put and fixed on the package with the polypropylene-made packing interposed therebetween. The can was then sealed to produce a coin-shaped capacitor of 20 mm in diameter and about 2 mm in thickness. As the electrolyte, a solution with tetraethylammonium tetrafluoroborate dissolved at a concentration of 1 mole/L in propylene carbonate was employed. The capacitor obtained as described above was measured for capacitance and internal resistance. The results are shown in Table I-4.

Examples I-2 to I-4

Capacitors

As in Example I-1 except that the polyvinyl acetal resin solutions described below in Table I-4 were used at the same solid content in place of the polyvinyl acetal resin solution employed in Example I-1, electrode plates and capacitors were produced, and the respective characteristics were evaluated. The results are shown in Table I-4.

Comparative Example I-1

As in Example I-1 except that the polyvinyl acetal resin solution of Sample I-13 was used at the same solid content in place of the polyvinyl acetal resin solution employed in Example I-1, an electrode plate and a capacitor were produced, and the respective characteristics were evaluated. The results are shown in Table I-4.

Comparative Example I-2

As in Example I-1 except that a 5% solution of polyvinylidene fluoride in NMP was used at the same solid content in place of the polyvinyl acetal resin solution employed in Example I-1, an electrode plate and a capacitor were produced, and the respective characteristics were evaluated. The results are shown in Table I-4.

The internal resistance and capacitance described below in Table I-4 were measured and evaluated as will be described next.

With respect to each capacitor obtained, its capacitance and internal resistance were measured at a current density of 20 mA/cm$^2$, and based on Comparative Example I-2 as a reference, the capacitance and internal resistance were evaluated in accordance with the following evaluation standards, respectively. The greater the capacitance and the lower the internal resistance, the better the performance as a capacitor.
(Evaluation Standards for Capacitance)
  A: Capacitance greater by 20% or more than Comparative Example I-2.
  B: Capacitance greater by 10% or more but less than 20% than Comparative Example I-2.
  C: Capacitance equal to or smaller than Comparative Example I-2.
(Evaluation Standards for Internal Resistance)
  A: Internal resistance lower by 20% or more than Comparative Example I-2.
  B: Internal resistance lower by 10% or more but less than 20% than Comparative Example I-2.
  C: Internal resistance equal to or higher than Comparative Example I-2.

TABLE I-4

| Exs./Comp. Exs. | Polyvinyl acetal resin solutions | Adhesion (average value) | Solubility/swellability | Capacitance | Internal resistance |
|---|---|---|---|---|---|
| Ex. I-1 | Sample I-1 | 98 | Not observed | A | A |
| Ex. I-2 | Sample I-2 | 94 | Not observed | A | A |
| Ex. I-3 | Sample I-7 | 96 | Not observed | A | A |
| Ex. I-4 | Sample I-8 | 99 | Not observed | A | A |
| Comp. Ex. I-1 | Sample I-13 | 68 | Observed | B | B |
| Comp. Ex. I-2 | PVDF soln. | 41 | Not observed | — | — |

As evident from the above examples and comparative examples, a capacitor of large capacitance and low internal resistance can be obtained when electrode plates are produced using the capacitor coating formulation according the present invention and the capacitor is manufactured using the electrode plates.

Undercoating Formulations

Example I-1

Undercoating Formulation, Electrode Plate

An undercoating formulation employed in this example and containing a conductive material was prepared by a procedure to be described hereinafter. Acetylene black as a conductive material and the solution of Sample I-1 described above in Table I-1 were stirred and mixed at a mixing ratio of 7 parts and 93 parts at a rotation speed of 60 rpm for 120 minutes in the planetary mixer to obtain a slurry-form undercoating formulation.

Using the undercoating formulation obtained as described above and employing, as a substrate, a collector material formed of a 20-μm thick aluminum foil, the undercoating formulation was applied onto one side of the substrate by the comma roll coater. The thus-coated substrate was then dried for 2 minutes in the oven controlled at 110° C., and was further dried for 2 minutes in the oven controlled at 180° C. to eliminate the solvent and to crosslink the binder, so that an undercoat layer was formed with a dry thickness of 1 μm on the collector material.

A positive-electrode coating formulation containing a positive-electrode active material was next prepared by a procedure to be described hereinafter. As materials for the positive-electrode coating formulation, $LiCoO_2$ powder having particle sizes of from 1 to 100 μm, acetylene black as a conductive aid and a 5% solution of polyvinylidene fluoride (as a binder) in NMP (PVDF solution) were stirred and mixed at a mixing ratio of 90 parts, 5 parts and 50 parts at a rotation speed of 60 rpm for 120 minutes in the planetary mixer to obtain a slurry-form, positive-electrode coating formulation with the positive-electrode active material contained therein.

Using the positive-electrode coating formulation obtained as described above, it was applied onto the surface of the undercoat layer by the comma roll coater. The thus-coated substrate was then dried for 2 minutes in the oven controlled at 110° C., and was further dried for 2 minutes in the oven controlled at 180° C. to eliminate the solvent, so that a positive electrode plate with an active material layer formed with a dry thickness of 100 μm on the undercoat layer was obtained. The positive electrode plate obtained by the above-described procedure was pressed under the conditions of 5,000 $kgf/cm^2$ to make the active material layer uniform. Subsequently, aging was conducted for 48 hours in the vacuum oven controlled at 80° C. to fully eliminate volatiles (the solvent, the unreacted polybasic acid, etc.), so that a positive electrode plate was obtained. With respect to the positive electrode plate, the adhesion and internal resistance were measured similarly to the foregoing, and were evaluated in accordance with the same standards as described above. The results described in Table I-5 were obtained.

Examples I-2 to I-4

Undercoating Formulations, Electrode Plates

Undercoating formulations were prepared as in Example I-1 except that the polyvinyl acetal resin solutions described below in Table I-5 were used in place of the polyvinyl acetal resin solution for the undercoating formulation in Example I-1, and then, electrode plates were produced as in Example I-1. With respect to each of the electrode plates, the adhesion of the active material layer and the internal resistance were measured similarly to the foregoing, and were evaluated in accordance with the same standards as described above. The results described in Table I-5 were obtained.

Comparative Example I-1

An electrode plate with an active material layer formed thereon was produced as in Example I-1 except that the undercoat layer was not formed. The adhesion of the active material layer and the internal resistance were measured similarly to the foregoing, and were evaluated in accordance with the same standards as described above. The results described in Table I-5 were obtained.

TABLE I-5

| Exs./ Comp. Exs. | Polyvinyl acetal resin solutions | Adhesion (average value) | Internal resistance |
| --- | --- | --- | --- |
| Ex. I-1 | Sample I-1 | 97 | A |
| Ex. I-2 | Sample I-2 | 97 | A |

TABLE I-5-continued

| Exs./ Comp. Exs. | Polyvinyl acetal resin solutions | Adhesion (average value) | Internal resistance |
| --- | --- | --- | --- |
| Ex. I-3 | Sample I-7 | 95 | A |
| Ex. I-4 | Sample I-8 | 99 | A |
| Comp. Ex. I-1 | — | 38 | B |

Example I-5

A negative electrode plate was produced as in Comparative Example I-5 of the [Application to batteries] except that an undercoat layer was formed using the undercoating formulation employed in Example I-1. The negative electrode plate was found to have excellent adhesion and internal resistance as in Example I-1.

Example I-6

An electrode plate and capacitor were produced as in Comparative Example I-2 of the [Application to capacitors] except that an undercoat layer was formed using the undercoating formulation employed in Example I-1. The electrode plate and capacitor were found to have excellent adhesion and internal resistance, respectively, as in Example I-1 of the [Application to capacitors].

Examples (II) of Ethylene-Vinyl Alcohol Copolymers

Preparation of Ethylene-Vinyl Alcohol Copolymer (EVOH Resin) Solutions

The compositions of individual EVOH resin solutions employed in examples and comparative examples are shown in Table II-1. Concerning polar solvents used in the respective EVOH resin solutions, the following abbreviations will be used: NMP (N-methyl-2-pyrrolidone), NEP (N-ethyl-2-pyrrolidone), DMF (N,N-dimethylformamide), DMSO (dimethylsulfoxide), DMAc (N,N-dimethylacetamide), DMI (1,3-dimethyl-2-imidazolidinone), NPA (propanol), IPA (isopropyl alcohol), NBA (butyl alcohol), and TBA (t-butyl alcohol).

Sample II-1

In NMP (93 parts), an EVOH resin [5 parts; product of Kuraray Co., Ltd., "EVAL G156A" (copolymerized ethylene content: 48 mole %) was dispersed. After pyromellitic acid (2 parts) was added to the dispersion, the resulting mixture was stirred at 50° C. for 2 hours to prepare an EVOH resin solution (100 parts) according to the present invention.

Samples II-2 to II-14

EVOH resin solutions according to the present invention were prepared by a similar procedure as in Sample II-1 except that the copolymerized ethylene content and/or amount of the EVOH resin, the kind and/or amount of the polybasic acid, the mixing ratio of the EVOH resin to the polybasic acid, and/or the kind and/or amount of the polar solvent were changed as shown in Table II-1.

TABLE II-1

| Samples | EVOH resins Copolymerized ethylene content (mole %) | Parts | Polybasic acids Kind | Parts | Polar solvents Kind | Parts |
|---|---|---|---|---|---|---|
| II-1 | 48 | 5 | Pyromellitic acid | 2 | NMP | 93 |
| II-2 | 38 | 3 | Pyromellitic acid | 2 | Water/NPA | 95 |
| II-3 | 24 | 10 | Pyromellitic acid | 8 | NMP | 82 |
| II-4 | 48 | 5 | Pyromellitic anhydride | 3 | Water/IPA | 92 |
| II-5 | 48 | 5 | Trimellitic acid | 3 | NMP/NBA | 92 |
| II-6 | 48 | 5 | Trimellitic anhydride | 3 | NMP/TBA | 92 |
| II-7 | 48 | 5 | BTC | 3 | NMP | 92 |
| II-8 | 48 | 5 | NTC | 3 | NMP | 92 |
| II-9 | 48 | 5 | Pyromellitic acid | 2.5 | NEP | 92.5 |
| II-10 | 38 | 5 | Pyromellitic acid | 3 | DMF | 92 |
| II-11 | 24 | 5 | Pyromellitic acid | 5 | DMSO | 90 |
| II-12 | 48 | 5 | Pyromellitic acid | 4 | DMAc | 91 |
| II-13 | 48 | 5 | Pyromellitic acid | 1.5 | DMI | 93.5 |
| II-14 | 48 | 5 | — | — | NMP | 95 |

BTC: 1,2,3,4-butanetetracarboxylic acid
NTC: 1,4,5,8-naphthalenetetracarboxylic acid
Water/NPA: Water/NPA = 50/50
Water/IPA: Water/IPA = 40/60
NMP/NBA: NMP/NBA = 70/30
NMP/TBA: NMP/TBA = 80/20

Application to Batteries

Example II-1

Coating Formulation, Electrode Plate

A positive-electrode coating formulation employed in this example and containing a positive-electrode active material was prepared by a procedure to be described hereinafter. As materials for the positive-electrode coating formulation, $LiCoO_2$ powder having particle sizes of from 1 to 100 μm, acetylene black as a conductive aid and the solution of Sample II-1 (as a binder) described above in Table II-1 were stirred and mixed at a mixing ratio of 90 parts, 5 parts and 60 parts at a rotation speed of 60 rpm for 120 minutes in the planetary mixer to obtain a slurry-form, positive-electrode coating formulation with the positive-electrode active material contained therein.

Using the positive-electrode coating formulation obtained as described above and employing, as a substrate, a collector material formed of a 20-μm thick aluminum foil, the positive-electrode coating formulation was applied onto one side of the substrate by the comma roll coater. The thus-coated substrate was then dried for 2 minutes in the oven controlled at 110° C., and was further dried for 2 minutes in the oven controlled at 180° C. to eliminate the solvent and to crosslink the binder, so that a positive electrode plate with an active material layer formed with a dry thickness of 100 on the collector material was obtained. The positive electrode plate obtained by the above-described procedure was pressed under the conditions of 5,000 kgf/cm² to make the active material layer uniform. Subsequently, aging was conducted for 48 hours in the vacuum oven controlled at 80° C. to fully eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer of one of specimens cut from the positive electrode plate to form 100 squares within 1 cm². A mending tape was applied to the surface of the active material layer, and tape peeling was then conducted. The number of squares which did not peel off was determined as a measure of adhesion. The average of 10 tests was 98.0 squares. Further, after another one of the specimens, said another specimen being provided with squares formed thereon in a similar manner as described above, was immersed at 50° C. for 24 hours in a mixed solvent of EC (ethylene carbonate), PC (propylene carbonate) and DME (dimethoxyethane) combined together at a volume ratio of 1:1:2, conditions of its active material layer were observed. One developed no changes is indicated as "not observed" under "solubility/swellability", while one with its active material layer having peeled or swollen is indicated as "observed" under "solubility/swellability". To evaluate the oxidation resistance of the active material layer (binder), a still further specimen (2 cm×3 cm) cut from the positive electrode plate was immersed in a 6% aqueous solution of hydrogen peroxide, and was then subjected to heat treatment (80° C.×3 hours). Conditions of the active material layer after the heat treatment were observed. One developed no changes is indicated as "observed" under "oxidation resistance", while one with its active material layer having peeled is indicated as "not observed" under "oxidation resistance".

Examples II-2 to II-13 & Comparative Examples II-1 to II-3

Coating Formulations and Electrode Plates

Positive electrode plates were produced as in Example II-1 except that the EVOH resin solutions described below in Table II-2 were used in place of the EVOH resin solution in Example II-1. Specimens cut from each positive electrode plate were tested for the adhesion of the active material layer to the collector and the solubility/swellability and oxidation resistance of the active material layer, respectively, as in Example II-1. The results described below in Table II-2 were obtained. It is to be noted that a 5% solution of polyvinylidene fluoride (PVDF solution) in NMP was used in Comparative Example II-2, and also that a styrene-butadiene copolymer latex (with sodium carboxymethylcellulose used as a thickening agent) was used in Comparative Example II-3.

TABLE II-2

| Exs./Comp. Exs. | EVOH resin solutions | Amount of EVOH resin solution used per 100 parts of active material (parts; solid content) | Adhesion (average value) | Solubility/ swellability | Oxidation resistance |
|---|---|---|---|---|---|
| Ex. II-1 | Sample II-1 | 3 | 98 | Not observed | Observed |
| Ex. II-2 | Sample II-2 | 5 | 99 | Not observed | Observed |
| Ex. II-3 | Sample II-3 | 7 | 100 | Not observed | Observed |
| Ex. II-4 | Sample II-4 | 4 | 98 | Not observed | Observed |
| Ex. II-5 | Sample II-5 | 5 | 97 | Not observed | Observed |
| Ex. II-6 | Sample II-6 | 5 | 95 | Not observed | Observed |
| Ex. II-7 | Sample II-7 | 5 | 99 | Not observed | Observed |
| Ex. II-8 | Sample II-8 | 4 | 93 | Not observed | Observed |
| Ex. II-9 | Sample II-9 | 5 | 98 | Not observed | Observed |
| Ex. II-10 | Sample II-10 | 2 | 90 | Not observed | Observed |
| Ex. II-11 | Sample II-11 | 5 | 99 | Not observed | Observed |
| Ex. II-12 | Sample II-12 | 5 | 98 | Not observed | Observed |
| Ex. II-13 | Sample II-13 | 6 | 91 | Not observed | Observed |
| Comp. Ex. II-1 | Sample II-14 | 5 | 76 | Observed | Observed |
| Comp. Ex. II-2 | PVDF soln. | 5 | 37 | Not observed | Observed |
| Comp. Ex. II-3 | SBR + CMC dispn. | 3 | 95 | Observed | Not observed |

SBR: styrene-butadiene copolymer latex (product of Nippon A&L Inc., "NALSTAR-SR-112")
CMC: sodium carboxymethylcellulose (product of Nippon Paper Chemical Co., Ltd., "SUNROSE F-600LG")

Example II-14

Coating Formulation, Electrode Plate

A negative-electrode coating formulation employed in this example and containing a negative-electrode active material was prepared by a procedure to be described next. Carbon powder obtained by thermal degradation of coal coke at 1,200° C., acetylene black as a conductive aid and the solution of Sample II-4 described above in Table II-1 were stirred and mixed at a mixing ratio of 90 parts, 5 parts and 80 parts at a rotation speed of 60 rpm for 120 minutes in the planetary mixer to obtain a slurry-form coating formulation with the negative-electrode active material contained therein.

The coating formulation containing the negative-electrode active material and obtained as described above was applied onto a copper-foil collector material by using the comma roll coater. After the thus-coated collector material was processed through a drying step, it was dried for 2 minutes in the oven controlled at 110° C., and was further dried for 2 minutes in the oven controlled at 180° C. to eliminate the solvent and to crosslink the binder, so that an active material layer was formed with a dry thickness of 100 µm on the collector material. A negative electrode plate obtained by the above-described procedure was pressed under the conditions of 5,000 kgf/cm$^2$ to make the active material layer uniform. Subsequently, aging was conducted for 48 hours in the vacuum oven controlled at 80° C. to fully eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer of one of specimens cut from the negative electrode plate to form 100 squares within 1 cm$^2$. A mending tape was applied to the surface of the active material layer, and tape peeling was then conducted. The number of squares which did not peel off was determined as a measure of adhesion. The average of 10 tests was 98 squares. The solubility/swellability of the active material layer was also evaluated as in Example II-1.

Examples II-15 to II-26 & Comparative Examples II-4 to II-5

Coating Formulations and Electrode Plates

Negative electrode plates were produced as in Example II-14 except that the EVOH resin solutions described below in Table II-3 were used in place of the EVOH resin solution in Example II-14. Specimens cut from each negative electrode plate were tested for the adhesion of the active material layer to the collector and the solubility/swellability of the active material layer, respectively, as in Example II-14. The results described below in Table II-3 were obtained. It is to be noted that a 5% solution of polyvinylidene fluoride (PVDF solution) in NMP was used in Comparative Example II-5.

TABLE II-3

| Exs./Comp. Exs. | EVOH resin solutions | Amount of EVOH resin solution used per 100 parts of active material (parts; solid content) | Adhesion (average value) | Solubility/ swellability |
|---|---|---|---|---|
| Ex. II-14 | Sample II-4 | 4 | 98 | Not observed |
| Ex. II-15 | Sample II-1 | 4 | 100 | Not observed |
| Ex. II-16 | Sample II-2 | 3 | 96 | Not observed |
| Ex. II-17 | Sample II-3 | 5 | 99 | Not observed |
| Ex. II-18 | Sample II-5 | 5 | 97 | Not observed |
| Ex. II-19 | Sample II-6 | 5 | 99 | Not observed |
| Ex. II-20 | Sample II-7 | 8 | 100 | Not observed |
| Ex. II-21 | Sample II-8 | 2 | 89 | Not observed |
| Ex. II-22 | Sample II-9 | 5 | 98 | Not observed |

TABLE II-3-continued

| Exs./Comp. Exs. | EVOH resin solutions | Amount of EVOH resin solution used per 100 parts of active material (parts; solid content) | Adhesion (average value) | Solubility/ swellability |
|---|---|---|---|---|
| Ex. II-23 | Sample II-10 | 4 | 95 | Not observed |
| Ex. II-24 | Sample II-11 | 5 | 97 | Not observed |
| Ex. II-25 | Sample II-12 | 5 | 98 | Not observed |
| Ex. II-26 | Sample II-13 | 5 | 93 | Not observed |
| Comp. Ex. II-4 | Sample II-14 | 5 | 72 | Observed |
| Comp. Ex. II-5 | PVDF soln. | 5 | 43 | Not observed |

Example II-27

Battery

An electrode unit was first constructed by using the positive electrode plate obtained above in Example II-1 and the negative electrode plate obtained above in Example II-14, and rolling them into a volute form with a separator interposed therebetween. The separator was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a battery of the AA size and 500 mAh rated capacity was assembled. Charged as an electrolyte into the battery was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of battery characteristics, a charge-discharge measuring instrument was used. Twenty (20) batteries were charged all together at the temperature condition of 25° C. and the current value of a 0.2 CA charging current, firstly in a charging direction until a battery voltage reached 4.1 V. After a break of 10 minutes, the batteries were discharged at the same current until 2.75 V was reached. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle was 98. With the batteries making use of the positive electrode plates of Examples II-2 to II-13 and the negative electrode plates of Examples II-15 to II-26, excellent results similar to those obtained above were also obtained.

Application to Capacitors

Example II-1

The EVOH resin solution of Sample II-1 (5 parts in terms of solid content), high-purity activated carbon powder (specific surface area: 1,500 $m^2/g$, average particle size: 10 μm; 100 parts) as an electrode active material and acetylene black (4 parts) as a conductivity-imparting material were charged in the planetary mixer, and NMP was added to give a total solid concentration of 45%, followed by mixing for 60 minutes. Subsequently, the mixture was diluted with NMP to a solid concentration of 42%, followed by further mixing for 10 minutes to obtain a coating formulation. Using the doctor blade, the coating formulation was applied onto a 20-μm thick aluminum foil, followed by drying at 80° C. for 30 minutes in the fan dryer. Using the roll press, pressing was then conducted to obtain a capacitor electrode plate having a thickness of 80 μm and a density of 0.6 $g/cm^3$. Specimens cut from the electrode plate were tested for its adhesion to the collector and its solubility/swellability in the solvent, respectively, as in Example II-1 of the [Application to batteries]. The results are shown in Table II-4.

Two specimens were provided by cutting out two discs of 15 mm in diameter from the electrode plate produced as described above, and were then dried at 200° C. for 20 hours. Those two specimens were arranged with their electrode layer sides opposing each other, and a cellulose-made, disc-shaped separator of 18 mm in diameter and 40 μm in thickness was held between the specimens. The thus-obtained electrode unit was placed in a coin-shaped package made of stainless steel (diameter: 20 mm, height: 1.8 mm, stainless steel thickness: 0.25 mm) and equipped with a polypropylene-made packing. An electrolyte was charged into the can such that no air was allowed to remain. A 0.2-mm thick stainless steel cap was put and fixed on the package with the polypropylene-made packing interposed therebetween. The can was then sealed to produce a coin-shaped capacitor of 20 mm in diameter and about 2 mm in thickness. As the electrolyte, a solution with tetraethylammonium tetrafluoroborate dissolved at a concentration of 1 mole/L in propylene carbonate was employed. The capacitor obtained as described above was measured for capacitance and internal resistance. The results are shown in Table II-4.

Example II-2

As in Example II-1 except that the EVOH resin solution of Sample II-3 was used at the same solid content in place of the EVOH resin solution employed in Example II-1, an electrode plate and capacitor were produced, and the respective characteristics were evaluated. The results are shown in Table II-4.

Example II-3

As in Example II-1 except that the EVOH resin solution of Sample II-7 was used at the same solid content in place of the EVOH resin solution employed in Example II-1, an electrode plate and capacitor were produced, and the respective characteristics were evaluated. The results are shown in Table II-4.

Example II-4

As in Example II-1 except that the EVOH resin solution of Sample II-8 was used at the same solid content in place of the EVOH resin solution employed in Example II-1, an electrode plate and capacitor were produced, and the respective characteristics were evaluated. The results are shown in Table II-4.

Comparative Example II-1

As in Example II-1 except that the EVOH resin solution of Sample II-14 was used at the same solid content in place of the EVOH resin solution employed in Example II-1, an electrode plate and capacitor were produced, and the respective characteristics were evaluated. The results are shown in Table II-4.

Comparative Example II-2

As in Example II-1 except that a 5% solution of polyvinylidene fluoride in NMP was used at the same solid content in place of the EVOH resin solution employed in Example II-1, an electrode plate and capacitor were produced, and the respective characteristics were evaluated. The results are shown in Table II-4.

The internal resistance and capacitance described below in Table II-4 were measured and evaluated as will be described next. With respect to each capacitor obtained, its capacitance and internal resistance were measured at a current density of 20 mA/cm$^2$, and based on Comparative Example II-2 as a reference, the capacitance and internal resistance were evaluated in accordance with the following evaluation standards, respectively. The greater the capacitance and the lower the internal resistance, the better the performance as a capacitor.
(Evaluation Standards for Capacitance)
 A: Capacitance greater by 20% or more than Comparative Example II-2.
 B: Capacitance greater by 10% or more but less than 20% than Comparative Example II-2.
 C: Capacitance equal to or smaller than Comparative Example II-2.
(Evaluation Standards for Internal Resistance)
 A: Internal resistance lower by 20% or more than Comparative Example II-2.
 B: Internal resistance lower by 10% or more but less than 20% than Comparative Example II-2.
 C: Internal resistance equal to or higher than Comparative Example II-2.

TABLE II-4

| Exs./Comp. Exs. | Adhesion (average value) | Solubility/swellability | Capacitance | Internal resistance |
|---|---|---|---|---|
| Ex. II-1 | 98 | Not observed | A | A |
| Ex. II-2 | 99 | Not observed | A | A |
| Ex. II-3 | 98 | Not observed | A | A |
| Ex. II-4 | 96 | Not observed | A | A |
| Comp. Ex. II-1 | 79 | Observed | B | B |
| Comp. Ex. II-2 | 42 | Not observed | — | — |

As evident from the above examples and comparative examples, a capacitor of large capacitance and low internal resistance can be obtained when electrode plates are produced using the coating formulation according the present invention and the capacitor is manufactured using the electrode plates.

Undercoating Formulations

Example II-1

Undercoating Formulation, Electrode Plate

An undercoating formulation employed in this example and containing a conductive material was prepared by a procedure to be described hereinafter. Acetylene black as a conductive material and the solution of Sample II-1 described above in Table II-1 were stirred and mixed at a mixing ratio of 7 parts and 93 parts at a rotation speed of 60 rpm for 120 minutes in the planetary mixer to obtain a slurry-form undercoating formulation.

Using the undercoating formulation obtained as described above and employing, as a substrate, a collector material formed of a 20-μm thick aluminum foil, the undercoating formulation was applied onto one side of the substrate by the comma roll coater. The thus-coated substrate was then dried for 2 minutes in the oven controlled at 110° C., and was further dried for 2 minutes in the oven controlled at 180° C. to eliminate the solvent and to crosslink the binder, so that an undercoat layer was formed with a dry thickness of 1 μm on the collector material.

A positive-electrode coating formulation containing a positive-electrode active material was next prepared by a procedure to be described hereinafter. As materials for the positive-electrode coating formulation, LiCoO$_2$ powder having particle sizes of from 1 to 100 μm, acetylene black as a conductive aid and a 5% solution of polyvinylidene fluoride (as a binder) in NMP (PVDF solution) were stirred and mixed at a mixing ratio of 90 parts, 5 parts and 50 parts at a rotation speed of 60 rpm for 120 minutes in the planetary mixer to obtain a slurry-form, positive-electrode coating formulation with the positive-electrode active material contained therein.

Using the positive-electrode coating formulation obtained as described, above, it was applied onto the surface of the undercoat layer by the comma roll coater. The thus-coated substrate was then dried for 2 minutes in the oven controlled at 110° C., and was further dried for 2 minutes in the oven controlled at 180° C. to eliminate the solvent, so that a positive electrode plate with an active material layer formed with a dry thickness of 100 μm on the undercoat layer was obtained. The positive electrode plate obtained by the above-described procedure was pressed under the conditions of 5,000 kgf/cm$^2$ to make the active material layer uniform. Subsequently, aging was conducted for 48 hours in the vacuum oven controlled at 80° C. to fully eliminate volatiles (the solvent, the unreacted polybasic acid, etc.), so that a positive electrode plate was obtained. With respect to the positive electrode plate, the adhesion and internal resistance were measured similarly to the foregoing, and were evaluated in accordance with the same standards as described above. The results described in Table II-5 were obtained.

Examples II-2 to II-4

Undercoating Formulations, Electrode Plates

Undercoating formulations were prepared as in Example II-1 except that the EVOH resin solutions described below in Table II-5 were used in place of the EVOH resin solution for the undercoating formulation in Example II-1, and then, electrode plates were produced as in Example II-1. With respect to each of the electrode plates, the adhesion of the active material layer and the internal resistance were measured similarly to the foregoing, and were evaluated in accordance with the same standards as described above. The results described in Table II-5 were obtained.

Comparative Example II-1

An electrode plate with an active material layer formed thereon was produced as in Example II-1 except that the undercoat layer was not formed. The adhesion of the active material layer and the internal resistance were measured similarly to the foregoing, and were evaluated in accordance with the same standards as described above. The results described in Table II-5 were obtained.

TABLE II-5

| Exs./ Comp. Exs. | EVOH resin solutions | Adhesion (average value) | Internal resistance |
|---|---|---|---|
| Ex. II-1 | Sample II-1 | 99 | A |
| Ex. II-2 | Sample II-3 | 99 | A |
| Ex. II-3 | Sample II-7 | 98 | A |
| Ex. II-4 | Sample II-8 | 95 | A |
| Comp. Ex. II-1 | — | 39 | B |

Example II-5

A negative electrode plate was produced as in Comparative Example II-5 of the [Application to batteries] except that an undercoat layer was formed using the undercoating formulation employed in Example II-1. The negative electrode plate was found to have excellent adhesion and internal resistance as in Example II-1.

Example II-6

A negative electrode plate was produced as in Comparative Example II-2 of the [Application to capacitors] except that an undercoat layer was formed using the undercoating formulation employed in Example II-1. The negative plate was found to have excellent adhesion and internal resistance as in Example II-1 of the [Application to capacitors].

the respective unmodified PVA resin solutions, the following, abbreviations will be used: MeOH (methyl alcohol), EtOH (ethyl alcohol), NMP (N-methyl-2-pyrrolidone), NEP (N-ethyl-2-pyrrolidone), DMF (N,N-dimethylformamide), DMSO (dimethylsulfoxide), DMAc (N,N-dimethylacetamide), and DMI (1,3-dimethyl-2-imidazolidinone).

Sample III-1

In NMP (91 parts), an unmodified PVA resin [5 parts; product of Kuraray Co., Ltd., "KURARAY POVAL 420" (saponification degree: 80%, polymerization degree: 2,000)] was dispersed. After pyromellitic acid (4 parts) was added to the dispersion, the resulting mixture was stirred at 60° C. for 2 hours to prepare an unmodified PVA resin solution (100 parts).

Samples III-2 to III-13

Unmodified PVA resin solutions according to the present invention were prepared by a similar procedure as in Sample III-1 except that the saponification degree, polymerization degree and/or amount of the unmodified PVA resin, the kind and/or amount of the polybasic acid, the mixing ratio of the unmodified PVA resin to the polybasic acid, and/or the kind and/or amount of the polar solvent were changed as shown in Table III-1.

TABLE III-1

| | Unmodified PVA Resin Solutions | | | | | | |
|---|---|---|---|---|---|---|---|
| | Unmodified PVA resins | | | Polybasic acids | | Polar solvents | |
| Samples | Saponification degree | Polymerization degree | Parts | Kind | Parts | Kind | Parts |
| III-1 | 80 | 2,000 | 5 | Pyromellitic acid | 4 | NMP | 91 |
| III-2 | 80 | 2,000 | 4 | Pyromellitic acid | 2 | Water | 94 |
| III-3 | 88 | 500 | 5 | Pyromellitic acid | 8 | NMP | 87 |
| III-4 | 65 | 500 | 7 | Pyromellitic anhydride | 3 | Water/MeOH | 90 |
| III-5 | 56 | 1,000 | 3 | Trimellitic acid | 3 | Water/EtOH | 94 |
| III-6 | 88 | 3,500 | 2 | Trimellitic anhydride | 3 | NMP/IPA | 95 |
| III-7 | 80 | 2,000 | 6 | BTC | 3 | NMP | 91 |
| III-8 | 95 | 1,700 | 5 | NTC | 3 | NEP | 92 |
| III-9 | 88 | 2,000 | 5 | Pyromellitic acid | 2.5 | DMF | 92.5 |
| III-10 | 98 | 1,700 | 5 | Pyromellitic acid | 3 | DMSO | 92 |
| III-11 | 35 | 500 | 5 | Pyromellitic acid | 1.5 | DMAc | 93.5 |
| III-12 | 95 | 1,700 | 5 | Pyromellitic acid | 4 | DMI | 91 |
| III-13 | 80 | 2,000 | 5 | — | — | NMP | 95 |

BTC: 1,2,3,4-butanetetracarboxylic acid
NTC: 1,4,5,8-naphthalenetetracarboxylic acid
Water/MeOH: Water/MeOH = 40/60
Water/EtOH: Water/EtOH = 50/50
NMP/IPA: NMP/IPA = 50/50

Examples (III) of Modified and Unmodified PVAs

Preparation of Unmodified PVA Resin Solutions (Coating Formulations according to the Present Invention)

The compositions of individual unmodified PVA resin solutions employed in examples and comparative examples are shown in Table III-1. Concerning polar solvents used in <Preparation of Modified PVA Resin Solutions (Coating Formulations according to the Present Invention)>

The compositions of individual modified PVA resin solutions employed in examples and comparative examples are shown in Table III-2.

Sample III-14

In NMP (91 parts), a modified PVA resin (5 parts; product of Nippon Synthetic Chemical Industry Co., Ltd., "GOHSEFIMER Z": acetoacetyl-modified PVA) was dispersed. After pyromellitic acid (4 parts) was added to the dispersion, the resulting mixture was stirred at 60° C. for 2 hours to prepare a modified PVA resin solution (100 parts).
Samples III-15 to III-19

Modified PVA resin solutions according to the present invention were prepared by a similar procedure as in Sample III-14 except that the kind and/or amount of the modified PVA resin, the kind and/or amount of the polybasic acid, the mixing ratio of the modified PVA resin to the polybasic acid, and/or the kind and/or amount of the polar solvent were changed as shown in Table III-2.

TABLE III-2

Modified PVA Resin Solutions

| Samples | Modified PVA resins Kind | Parts | Polybasic acids Kind | Parts | Polar solvents Kind | Parts |
|---|---|---|---|---|---|---|
| III-14 | Modified with acetoacetyl groups | 5 | Pyromellitic acid | 4 | NMP | 91 |
| III-15 | Modified with carboxyl groups | 5 | PTC | 5 | NMP | 90 |
| III-16 | Modified with carbonyl groups | 4 | CHTC | 3 | NMP | 93 |
| III-17 | Modified with sulfonic groups | 5 | CHHC | 3 | NMP | 92 |
| III-18 | Modified with cations | 5 | Trimellitic acid | 4 | NMP | 91 |
| III-19 | Modified with acetoacetyl groups | 5 | — | — | NMP | 95 |

PTC: 1,2,3-propanetricarboxylic acid
CHTC: 1,2,4,5-cyclohexanetetracarboxylic acid
CHHC: 1,2,3,4,5,6-cyclohexanehexacarboxylic acid Application to Batteries Example III-1

Coating Formulation, Electrode Plate

A positive-electrode coating formulation employed in this example and containing a positive-electrode active material was prepared by a procedure to be described hereinafter. As materials for the positive-electrode coating formulation, $LiCoO_2$ powder having particle sizes of from 1 to 100 μm, acetylene black as a conductive aid and the solution of Sample III-1 (as a binder) described above in Table III-1 were stirred and mixed at a mixing ratio of 90 parts, 5 parts and 60 parts at a rotation speed of 60 rpm for 120 minutes in the planetary mixer to obtain a slurry-form, positive-electrode coating formulation with the positive-electrode active material contained therein.

Using the positive-electrode coating formulation obtained as described above and employing, as a substrate, a collector material formed of a 20-μm thick aluminum foil, the positive-electrode coating formulation was applied onto one side of the substrate by the comma roll coater. The thus-coated substrate was then dried for 2 minutes in the oven controlled at 110° C., and was further dried for 2 minutes in the oven controlled at 180° C. to eliminate the solvent and to crosslink the binder, so that a positive electrode plate with an active material layer formed with a dry thickness of 100 μm on the collector material was obtained. The positive electrode plate obtained by the above-described procedure was pressed under the conditions of 5,000 kgf/cm² to make the active material layer uniform. Subsequently, aging was conducted for 48 hours in the vacuum oven controlled at 80° C. to fully eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer of one of specimens cut from the positive electrode plate to form 100 squares within 1 cm². A mending tape was applied to the surface of the active material layer, and tape peeling was then conducted. The number of squares which did not peel off was determined as a measure of adhesion. The average of 10 tests was 97.0 squares. Further, after another one of the specimens, said another specimen being provided with squares formed thereon in a similar manner as described above, was immersed at 50° C. for 24 hours in a mixed solvent of EC (ethylene carbonate), PC (propylene carbonate) and DME (dimethoxyethane) combined together at a volume ratio of 1:1:2, conditions of its active material layer were observed. One developed no changes is indicated as "not observed" under "solubility/swellability", while one with its active material layer having peeled or swollen is indicated as "observed" under "solubility/swellability". To evaluate the oxidation resistance of the active material layer (binder), a still further specimen (2 cm×3 cm) cut from the positive electrode plate was immersed in a 6% aqueous solution of hydrogen peroxide, and was then subjected to heat treatment (80° C.×3 hours). Conditions of the active material layer after the heat treatment were observed. One developed no changes is indicated as "observed" under "oxidation resistance", while one with its act ive material layer having peeled is indicated as "not observed" under "oxidation resistance".

Examples III-2 to III-17 & Comparative Examples III-1 to III-4

Coating Formulations and Electrode Plates

Positive electrode plates were produced as in Example III-1 except that the modified or unmodified PVA resin solutions described below in Table III-3 were used in place of the unmodified PVA resin solution in Example III-1. Specimens cut from each positive electrode plate were tested for the adhesion of the active material layer to the collector and the solubility/swellability and oxidation resistance of the active material layer, respectively, as in Example III-1. The results described below in Table III-3 were obtained. It is to be noted that a 5% solution of polyvinylidene fluoride (PVDF solution) in NMP was used in Comparative Example III-3, and also that a styrene-butadiene copolymer latex (with sodium carboxymethylcellulose used as a thickening agent) was used in Comparative Example III-4.

TABLE III-3

| Exs./Comp. Exs. | Modified or unmodified PVA resin solutions | Amount of modified or unmodified PVA resin solution used per 100 parts of active material (parts; solid content) | Adhesion (average value) | Solubility/swellability | Oxidation resistance |
|---|---|---|---|---|---|
| Ex. III-1 | Sample III-1 | 3 | 97 | Not observed | Observed |
| Ex. III-2 | Sample III-2 | 5 | 99 | Not observed | Observed |
| Ex. III-3 | Sample III-3 | 7 | 100 | Not observed | Observed |
| Ex. III-4 | Sample III-4 | 4 | 98 | Not observed | Observed |
| Ex. III-5 | Sample III-5 | 5 | 97 | Not observed | Observed |
| Ex. III-6 | Sample III-6 | 5 | 95 | Not observed | Observed |
| Ex. III-7 | Sample III-7 | 5 | 99 | Not observed | Observed |
| Ex. III-8 | Sample III-8 | 4 | 93 | Not observed | Observed |
| Ex. III-9 | Sample III-9 | 5 | 98 | Not observed | Observed |
| Ex. III-10 | Sample III-10 | 2 | 90 | Not observed | Observed |
| Ex. III-11 | Sample III-11 | 5 | 99 | Not observed | Observed |
| Ex. III-12 | Sample III-12 | 4 | 98 | Not observed | Observed |
| Ex. III-13 | Sample III-14 | 4 | 94 | Not observed | Observed |
| Ex. III-14 | Sample III-15 | 5 | 97 | Not observed | Observed |
| Ex. III-15 | Sample III-16 | 5 | 95 | Not observed | Observed |
| Ex. III-16 | Sample III-17 | 6 | 98 | Not observed | Observed |
| Ex. III-17 | Sample III-18 | 5 | 96 | Not observed | Observed |
| Comp. Ex. III-1 | Sample III-13 | 5 | 58 | Observed | Observed |
| Comp. Ex. III-2 | Sample III-19 | 5 | 64 | Observed | Observed |
| Comp. Ex. III-3 | PVDF soln. | 5 | 37 | Not observed | Observed |
| Comp. Ex. III-4 | SBR + CMC dispn. | 3 | 95 | Not observed | Not observed |

SBR: styrene-butadiene copolymer latex (product of Nippon A&L Inc., "NALSTAR-SR-112")
CMC: sodium carboxymethylcellulose (product of Nippon Paper Chemical Co., Ltd., "SUNROSE F-600LC")

Example III-18

Coating Formulation, Electrode Plate

A negative-electrode coating formulation employed in this example and containing a negative-electrode active material was prepared by a procedure to be described next. Carbon powder obtained by thermal degradation of coal coke at 1,200° C., acetylene black as a conductive aid and the solution of Sample III-8 described above in Table III-1 were stirred and mixed at a mixing ratio of 90 parts, 5 parts and 80 parts at a rotation speed of 60 rpm for 120 minutes in the planetary mixer to obtain a slurry-form coating formulation with the negative-electrode active material contained therein.

The coating formulation containing the negative-electrode active material and obtained as described above was applied onto a copper-foil collector material by using the comma roll coater. After the thus-coated collector material was processed through a drying step, it was dried for 2 minutes in the oven controlled at 110° C., and was further dried for 2 minutes in the oven controlled at 180° C. to eliminate the solvent and to crosslink the binder, so that an active material layer was formed with a dry thickness of 100 μm on the collector material. A negative electrode plate obtained by the above-described procedure was pressed under the conditions of 5,000 kgf/cm² to make the active material layer uniform. Subsequently, aging was conducted for 48 hours in the vacuum oven controlled at 80° C. to fully eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer of one of specimens cut from the negative electrode plate to form 100 squares within 1 cm². A mending tape was applied to the surface of the active material layer, and tape peeling was then conducted. The number of squares which did not peel off was determined as a measure of adhesion. The average of 10 tests was 98 squares. The solubility/swellability of the active material layer was also evaluated as in Example III-1.

Examples III-19 to III-34 & Comparative Examples III-5 to III-7

Coating Formulations and Electrode Plates

Negative electrode plates were produced as in Example III-18 except that the modified or unmodified PVA resin solutions described below in Table III-4 were used in place of the unmodified PVA resin solution in Example III-18. Specimens cut from each negative electrode plate were tested for the adhesion of the active material layer to the collector and the solubility/swellability of the active material layer, respectively, as in Example III-18. The results described below in Table III-4 were obtained. It is to be noted that a 5% solution of polyvinylidene fluoride (PVDF solution) in NMP was used in Comparative Example III-7.

TABLE III-4

| Exs./Comp. Exs. | Modified or unmodified PVA resin solutions | Amount of modified or unmodified PVA resin solution used per 100 parts of active material (parts; solid content) | Adhesion (average value) | Solubility/ swellability |
|---|---|---|---|---|
| Ex. III-18 | Sample III-8 | 4 | 98 | Not observed |
| Ex. III-19 | Sample III-1 | 5 | 99 | Not observed |
| Ex. III-20 | Sample III-2 | 3 | 96 | Not observed |
| Ex. III-21 | Sample III-3 | 5 | 98 | Not observed |
| Ex. III-22 | Sample III-4 | 5 | 97 | Not observed |
| Ex. III-23 | Sample III-5 | 7 | 100 | Not observed |
| Ex. III-24 | Sample III-6 | 3 | 92 | Not observed |
| Ex. III-25 | Sample III-7 | 2 | 89 | Not observed |
| Ex. III-26 | Sample III-9 | 5 | 98 | Not observed |
| Ex. III-27 | Sample III-10 | 4 | 95 | Not observed |
| Ex. III-28 | Sample III-11 | 5 | 97 | Not observed |
| Ex. III-29 | Sample III-12 | 5 | 99 | Not observed |
| Ex. III-30 | Sample III-14 | 5 | 96 | Not observed |
| Ex. III-31 | Sample III-15 | 5 | 97 | Not observed |
| Ex. III-32 | Sample III-16 | 5 | 96 | Not observed |
| Ex. III-33 | Sample III-17 | 4 | 94 | Not observed |
| Ex. III-34 | Sample III-18 | 5 | 97 | Not observed |
| Comp. Ex. III-5 | Sample III-13 | 5 | 62 | Observed |
| Comp. Ex. III-6 | Sample III-19 | 5 | 68 | Observed |
| Comp. Ex. III-7 | PVDF soln. | 5 | 39 | Not observed |

Example III-35

Battery

An electrode unit was first constructed by using the positive electrode plate obtained above in Example III-1 and the negative electrode plate obtained above in Example III-18, and rolling them into a volute form with a separator interposed therebetween. The separator was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a battery of the AA size and 500 mAh rated capacity was assembled. Charged as an electrolyte into the battery was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of battery characteristics, a charge-discharge measuring instrument was used. Twenty (20) batteries were charged all together at the temperature condition of 25° C. and the current value of a 0.2 CA charging current, firstly in a charging direction until a battery voltage reached 4.1 V. After a break of 10 minutes, the batteries were discharged at the same current until 2.75 V was reached. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle was 98. With the batteries making use of the positive electrode plates of Examples III-2 to III-17 and the negative electrode plates of Examples III-19 to III-34, excellent results similar to those obtained above were also obtained.

Application to Capacitors

Example III-1

Capacitor

The Unmodified PVA resin solution of Sample III-1 (5 parts in terms of solid content), high-purity activated carbon powder (specific surface area: 1,500 $m^2/g$, average particle size: 10 μm; 100 parts) as an electrode active material and acetylene black (4 parts) as a conductivity-imparting material were charged in the planetary mixer, and NMP was added to give a total solid concentration of 45%, followed by mixing for 60 minutes. Subsequently, the mixture was diluted with NMP to a solid concentration of 42%, followed by further mixing for 10 minutes to obtain a coating formulation. Using the doctor blade, the coating formulation was applied onto a 20-μm thick aluminum foil, followed by drying at 80° C. for 30 minutes in the fan dryer. Using the roll press, pressing was then conducted to obtain a capacitor electrode plate having a thickness of 80 μm and a density of 0.6 $g/cm^3$. Specimens cut from the electrode plate were tested for its adhesion to the collector and its solubility/swellability in the solvent, respectively, as in Example III-1 of the [Application to batteries]. The results are shown in Table III-5.

Two specimens were provided by cutting out two discs of 15 mm in diameter from the electrode plate produced as described above, and were then dried at 200° C. for 20 hours. Those two specimens were arranged with their electrode layer sides opposing each other, and a cellulose-made, disc-shaped separator of 18 mm in diameter and 40 μm in thickness was held between the specimens. The thus-obtained electrode unit was placed in a coin-shaped package made of stainless steel (diameter: 20 mm, height: 1.8 mm, stainless steel thickness: 0.25 mm) and equipped with a polypropylene-made packing. An electrolyte was charged into the can such that no air was allowed to remain. A 0.2-mm thick stainless steel cap was put and fixed on the package with the polypropylene-made packing interposed therebetween. The can was then sealed to produce a coin-shaped capacitor of 20 mm in diameter and about 2 mm in thickness. As the electrolyte, a solution with tetraethylammonium tetrafluoroborate dissolved at a concentration of 1 mole/L in propylene carbonate was employed. The capacitor obtained as described above was measured for capacitance and internal resistance. The results are shown in Table III-5.

Examples III-2 to III-6

Capacitors

As in Example III-1 except that the modified or unmodified PVA resin solutions described below in Table III-5 were used at the same solid content in place of the unmodified PVA resin solution employed in Example III-1, electrode plates and capacitors were produced, and the respective characteristics were evaluated. The results are shown in Table III-5.

A: Capacitance greater by 20% or more than Comparative Example III-3.

B: Capacitance greater by 10% or more but less than 20% than Comparative Example III-3.

C: Capacitance equal to or smaller than Comparative Example III-3.

(Evaluation Standards for Internal Resistance)

A: Internal resistance lower by 20% or more than Comparative Example III-3.

B: Internal resistance lower by 10% or more but less than 20% than Comparative Example III-3.

C: Internal resistance equal to or higher than Comparative Example III-3.

TABLE III-5

| Exs./ Comp. Exs. | Modified or unmodified PVA resin solutions | Adhesion (average value) | Solubility/ swellability | Capacitance | Internal resistance |
|---|---|---|---|---|---|
| Ex. III-1 | Sample III-1 | 99 | Not observed | A | A |
| Ex. III-2 | Sample III-2 | 97 | Not observed | A | A |
| Ex. III-3 | Sample III-7 | 98 | Not observed | A | A |
| Ex. III-4 | Sample III-8 | 96 | Not observed | A | A |
| Ex. III-5 | Sample III-14 | 98 | Not observed | A | A |
| Ex. III-6 | Sample III-15 | 97 | Not observed | A | A |
| Comp. Ex. III-1 | Sample III-13 | 58 | Observed | B | B |
| Comp. Ex. III-2 | Sample III-19 | 63 | Observed | B | B |
| Comp. Ex. III-3 | PVDF soln. | 41 | Not observed | — | — |

Comparative Example III-1

As in Example III-1 except that the unmodified PVA resin solution of Sample III-13 was used at the same solid content in place of the unmodified PVA resin solution employed in Example III-1, an electrode plate and capacitor were produced, and the respective characteristics were evaluated. The results are shown in Table III-5.

Comparative Example III-2

As in Example III-1 except that the modified PVA resin solution of Sample III-19 was used at the same solid content in place of the unmodified PVA resin solution employed in Example III-1, an electrode plate and capacitor were produced, and the respective characteristics were evaluated. The results are shown in Table III-5.

Comparative Example III-3

As in Example III-1 except that a 5% solution of polyvinyl fluoride in NMP was used at the same solid content in place of the unmodified PVA resin solution employed in Example III-1, an electrode plate and capacitor were produced, and the respective characteristics were evaluated. The results are shown in Table III-5.

The internal resistance and capacitance described below in Table III-5 were measured and evaluated as will be described next. With respect to each capacitor obtained, its capacitance and internal resistance were measured at a current density of 20 mA/cm², and based on Comparative Example III-3 as a reference, the capacitance and internal resistance were evaluated in accordance with the following evaluation standards, respectively. The greater the capacitance and the lower the internal resistance, the better the performance as a capacitor.

(Evaluation Standards for Capacitance)

As evident from the above examples and comparative examples, a capacitor of large capacitance and low internal resistance can be obtained when electrode plates are produced using the coating formulation according the present invention and the capacitor is manufactured using the electrode plates.

Undercoating Formulations

Example III-1

Undercoating Formulation, Electrode Plate

An undercoating formulation employed in this example and containing a conductive material was prepared by a procedure to be described hereinafter. Acetylene black as a conductive material and the solution of Sample III-1 described above in Table III-1 were stirred and mixed at a mixing ratio of 7 parts and 93 parts at a rotation speed of 60 rpm for 120 minutes in the planetary mixer to obtain a slurry-form undercoating formulation.

Using the undercoating formulation obtained as described above and employing, as a substrate, a collector material formed of a 20-µm thick aluminum foil, the undercoating formulation was applied onto one side of the substrate by the comma roll coater. The thus-coated substrate was then dried for 2 minutes in the oven controlled at 110° C., and were further dried for 2 minutes in the oven controlled at 180° C. to eliminate the solvent and to crosslink the binder, so that an undercoat layer was formed with a dry thickness of 1 µm on the collector material.

A positive-electrode coating formulation containing a positive-electrode active material was next prepared by a procedure to be described hereinafter. As materials for the positive-electrode coating formulation, $LiCoO_2$ powder having particle sizes of from 1 to 100 µm, acetylene black as a conductive aid and a 5% solution of polyvinylidene fluoride (as a binder) in NMP (PVDF solution) were stirred and mixed at a mixing ratio of 90 parts, 5 parts and 50 parts at a rotation speed of 60 rpm for 120 minutes in the planetary mixer to obtain a slurry-form, positive-electrode coating formulation with the positive-electrode active material contained therein.

Using the positive-electrode coating formulation obtained as described above, it was applied onto the surface of the undercoat layer by the comma roll coater. The thus-coated substrate was then dried for 2 minutes in the oven controlled at 110° C., and was further dried for 2 minutes in the oven controlled at 180° C. to eliminate the solvent, so that a positive electrode plate with an active material layer formed with a dry thickness of 100 on the undercoat layer was obtained. The positive electrode plate obtained by the above-described procedure was pressed under the conditions of 5,000 kgf/cm$^2$ to make the active material layer uniform. Subsequently, aging was conducted for 48 hours in the vacuum oven controlled at 80° C. to fully eliminate volatiles (the solvent, the unreacted polybasic acid, etc.), so that a positive electrode plate was obtained. With respect to the positive electrode plate, the adhesion and internal resistance were measured similarly to the foregoing, and were evaluated in accordance with the same standards as described above. The results described in Table III-6 were obtained.

Examples III-2 to III-6

Undercoating Formulations, Electrode Plates

Undercoating formulations were prepared as in Example III-1 except that the modified or unmodified PVA resin solutions described below in Table III-6 were used in place of the unmodified PVA resin solution for the undercoating formulation in Example III-1, and then, electrode plates were produced as in Example III-1. With respect to each of the electrode plates, the adhesion of the active material layer and the internal resistance were measured similarly to the foregoing, and were evaluated in accordance with the same standards as described above. The results described in Table III-6 were obtained.

Comparative Example III-1

An electrode plate with an active material layer formed thereon was produced as in Example III-1 except that the undercoat layer was not formed. The adhesion of the active material layer and the internal resistance were measured similarly to the foregoing, and were evaluated in accordance with the same standards as described above. The results described in Table III-6 were-obtained.

TABLE III-6

| Exs./ Comp. Exs. | Modified or unmodified PVA resin solutions | Adhesion (average value) | Internal resistance |
|---|---|---|---|
| Ex. III-1 | Sample III-1 | 99 | A |
| Ex. III-2 | Sample III-2 | 98 | A |
| Ex. III-3 | Sample III-7 | 98 | A |
| Ex. III-4 | Sample III-8 | 95 | A |
| Ex. III-5 | Sample III-14 | 97 | A |
| Ex. III-6 | Sample III-5 | 96 | A |
| Comp. Ex. III-1 | — | 38 | B |

Example III-7

A negative electrode plate was produced as in Comparative Example III-7 of the [Application to batteries] except that an undercoat layer was formed using the undercoating formulation employed in Example III-1. The negative electrode plate was found to have excellent adhesion and internal resistance as in Example III-1.

Example III-8

A negative electrode plate was produced as in Comparative Example III-3 of the [Application to capacitors] except that an undercoat layer was formed using the undercoating formulation employed in Example III-1. The negative plate was found to have excellent adhesion and internal resistance as in Example III-1 of the [Application to capacitors].

Example IV of Cyanoethylated Polymers

Synthesis Example IV-1

Production of Cyanoethylated Pullulan (1)

After pullulan (1 parts; product of Hayashibara Co., Ltd., "PI-20") was dissolved in deionized water (4 parts), a 25% aqueous solution of sodium hydroxide (1 parts) and acetone (4 parts) were added, and acrylonitrile (5 parts) was added further. The resulting mixture was subjected to a reaction at room temperature for 16 hours under stirring. After acetic acid (0.5 parts) was added to neutralize the reaction mixture, the neutralized reaction mixture was poured into deionized water to precipitate the reaction product. The resulting precipitate was redissolved in acetone, and then reprecipitated in deionized water to wash the same. After this operation was repeated, the purified product was dried at 60° C. under reduced pressure to afford cyanoethylated pullulan (1). As a result of an analysis for nitrogen by the Kjeldahl method, the polymer was found to have a cyanoethylation degree (reactivity to hydroxyl groups) of 87%. Further, the hydroxyl number of the polymer as determined in accordance with JIS K 0070-1992 was 84 mgKOH/g.

Synthesis Example IV-2

Production of Cyanoethylated Pullulan (2)

After pullulan (1 parts; product of Hayashibara Co., Ltd., "PI-20") was dissolved in deionized water (4 parts), a 25% aqueous solution of sodium hydroxide (1 parts) and acetone (4 parts) were added, and acrylonitrile (4 parts) was added further. The resulting mixture was subjected to a reaction at room temperature for 12 hours under stirring. After acetic acid (0.5 parts) was added to neutralize the reaction mixture, the neutralized reaction mixture was poured into deionized water to precipitate the reaction product. The resulting precipitate was redissolved in acetone, and then reprecipitated in deionized water to wash the same. After this operation was repeated, the purified product was dried at 60° C. under reduced pressure to afford cyanoethylated pullulan (2). As a result of an analysis for nitrogen by the Kjeldahl method, the polymer was found to have a cyanoethylation degree of 70%. Further, the hydroxyl number of the polymer was 205 mgKOH/g.

Synthesis Examples IV-3 to IV-11

By a similar procedure as in Synthesis Example IV-1 or IV-2, polyvinyl alcohol (PVA), cellulose, hydroxyethyl (HE)

cellulose, dihydroxypropyl (DHP) cellulose, starch, and dihydroxypropyl(DHP) chitosan were cyanoethylated. The kinds of the synthesized cyanoethylated polymers and the cyanoethylation degrees and hydroxyl numbers of these polymers are shown in Table IV-1.

TABLE IV-1

Cyanoethylated Polymers

| Synthesis examples | Kind | Cyanoethylated polymers Cyanoethylation degree | Hydroxyl number (mgKOH/g) |
|---|---|---|---|
| IV-1 | Cyanoethylated pullulan (1) | 87% | 84 |
| IV-2 | Cyanoethylated pullulan (2) | 70% | 205 |
| IV-3 | Cyanoethylated PVA (1) | 24% | 807 |
| IV-4 | Cyanoethylated PVA (2) | 77% | 175 |
| IV-5 | Cyanoethylated PVA (3) | 87% | 92 |
| IV-6 | Cyanoethylated PVA (4) | 95% | 33 |
| IV-7 | Cyanoethylated cellulose | 52% | 382 |
| IV-8 | Cyanoethylated HE cellulose | 78% | 101 |
| IV-9 | Cyanoethylated DHP cellulose | 83% | 97 |
| IV-10 | Cyanoethylated starch | 85% | 99 |
| IV-11 | Cyanoethylated DHP chitosan | 71% | 180 |

<Preparation of Cyanoethylated Polymer Solutions>
Samples IV-1 to IV-12

The compositions of individual cyanoethylated polymer solutions employed in examples and comparative examples are shown in Table IV-2. Concerning aprotonic polar solvents used in the respective cyanoethylated polymer solutions, the following abbreviations will be used: NMP (N-methyl-2-pyrrolidone), NEP (N-ethyl-2-pyrrolidone), DMF (N,N-dimethylformamide), DMSO (dimethylsulfoxide), DMAc (N,N-dimethylacetamide), and DMI (1,3-dimethyl-2-imidazolidinone).

TABLE IV-2

Cyanoethylated Polymer Solutions

| | Cyanoethylated polymers | | Organic acids | | Polar solvents | |
|---|---|---|---|---|---|---|
| Samples | Synthesis Example | Parts | Kind | Parts | Kind | Parts |
| IV-1 | IV-1 | 5 | BTC | 1 | NMP | 94 |
| IV-2 | IV-2 | 5 | Pyromellitic acid | 2 | NMP | 93 |
| IV-3 | IV-3 | 3 | Pyromellitic acid | 3 | NMP | 94 |
| IV-4 | IV-4 | 5 | Pyromellitic acid | 1.5 | NMP | 93.5 |
| IV-5 | IV-5 | 5 | Pyromellitic acid | 0.5 | NMP | 94.5 |
| IV-6 | IV-6 | 5 | Pyromellitic acid | 0.1 | NMP | 94.9 |
| IV-7 | IV-7 | 5 | Trimellitic acid | 2.5 | NEP | 92.5 |
| IV-8 | IV-8 | 5 | NTC | 1 | DMAc | 94 |
| IV-9 | IV-9 | 5 | Pyromellitic anhydride | 1 | DMI | 94 |
| IV-10 | IV-10 | 5 | Pyromellitic acid | 1.5 | DMF | 93.5 |
| IV-11 | IV-11 | 10 | BTC | 2 | DMSO | 88 |
| IV-12 | IV-4 | 5 | — | — | NMP | 95 |

BTC: 1,2,3,4-butanetetracarboxylic acid
NTC: 1,4,5,8-naphthalenetetracarboxylic acid Application to Protective Coating Formulations Examples IV-1 to IV-11 & Comparative Example IV-1

The coating formulations of Samples IV-1 to IV-12 in Table IV-2 were applied at a rate of 2 g/m² in terms of solid content to degreased surfaces of aluminum foils, respectively. The thus-coated aluminum foils were dried at 180° C. for 1 hour under an air stream to form colorless, transparent protective coatings. Each coating so obtained was cut together with the aluminum foil into 1 cm² pieces. Those pieces were placed in a 1:1:2 mixed solvent of ethylene carbonate, propylene carbonate and dimethyl carbonate. After left over at 25° C. for 30 days, conditions of the coating were observed. The coating formed from the coating formulation of Sample IV-12 had swollen and peeled off. On the coatings formed from the coating formulations of Samples IV-1 to IV-11, on the other hand, no changes were observed at all.

Application to Batteries

Example IV-1

Coating Formulation, Electrode Plate

A positive-electrode coating formulation employed in this example and containing a positive-electrode active material was prepared by a procedure to be described hereinafter. As materials for the positive-electrode coating formulation, $LiCoO_2$ powder having particle sizes of from 1 to 100 μm, acetylene black as a conductive aid and the solution of Sample IV-4 (as a binder) described above in Table IV-1 were stirred and mixed at a mixing ratio of 90 parts, 5 parts and 50 parts at a rotation speed of 60 rpm for 120 minutes in the planetary mixer to obtain a slurry-form, positive-electrode coating formulation with the positive-electrode active material contained therein.

Using the positive-electrode coating formulation obtained as described above and employing, as a substrate, a collector material formed of a 20-μm thick aluminum foil, the positive-electrode coating formulation was applied onto one side of the substrate by the comma roll coater. The thus-coated substrate was then dried for 2 minutes in the oven controlled at 110° C., and was further dried for 2 minutes in the oven controlled at 150° C. to eliminate the solvent and to crosslink the binder, so that a positive electrode plate with an active material layer formed with a dry thickness of 100 μm on the collector material was obtained. The positive electrode plate obtained by the above-described procedure was pressed under the conditions of 5,000 kgf/cm² to make the active material layer uniform. Subsequently, aging was conducted for 48 hours in the vacuum oven controlled at 80° C. to fully eliminate volatiles (the solvent, water, etc.).

Parallel lines, which consisted of perpendicularly-intersecting 11 vertical lines and 11 horizontal lines, were drawn by a cutter at intervals of 1 mm on the active material layer of one of specimens cut from the positive electrode plate to form 100 squares within 1 cm². A mending tape was applied to the surface of the active material layer, and tape peeling was then conducted. The number of squares which did not peel off was determined as a measure of adhesion. The average of 10 tests was 98.0 squares. Further, after another one of the specimens, said another specimen being provided with squares formed thereon in a similar manner as described above, was immersed at 50° C. for 24 hours in a mixed solvent of EC (ethylene carbonate) PC (propylene carbonate) and DME (dimethoxyethane) combined together at a volume ratio of 1:1:2, conditions of its active material layer were observed. One developed no changes is indicated as "not observed" under "solubility/swellability", while one with its active material layer having peeled or swollen is indicated as "observed" under "solubility/swellability".

Examples IV-2 to IV-11 & Comparative Examples IV-1 to IV-2

Coating Formulations and Electrode Plates

Positive electrode plates were produced as in Example IV-1 except that the cyanoethylated polymer solutions described below in Table IV-3 were used in place of the cyanoethylated polymer solution in Example IV-1. Specimens cut from each positive electrode plate were tested for the adhesion of the active material layer to the collector and the solubility/swellability of the active material layer, respectively, as in Example IV-1. The results described below in Table IV-3 were obtained. It is to be noted that a 5% solution of polyvinylidene fluoride (PVDF solution) was used in Comparative Example 2.

TABLE IV-3

| Exs./Comp. Exs. | Cyanoethylated polymer solutions | Amount of cyanoethylated polymer solution used per 100 parts of active material (parts; solid content) | Adhesion (average value) | Solubility/swellability |
|---|---|---|---|---|
| Ex. IV-1 | Sample IV-4 | 2.5 | 98 | Not observed |
| Ex. IV-2 | Sample IV-1 | 5 | 99 | Not observed |
| Ex. IV-3 | Sample IV-2 | 3 | 90 | Not observed |
| Ex. IV-4 | Sample IV-3 | 8 | 99 | Not observed |
| Ex. IV-5 | Sample IV-5 | 2 | 95 | Not observed |
| Ex. IV-6 | Sample IV-6 | 1 | 96 | Not observed |
| Ex. IV-7 | Sample IV-7 | 1 | 95 | Not observed |
| Ex. IV-8 | Sample IV-8 | 2 | 95 | Not observed |
| Ex. IV-9 | Sample IV-9 | 3 | 96 | Not observed |
| Ex. IV-10 | Sample IV-10 | 3 | 97 | Not observed |
| Ex. IV-11 | Sample IV-11 | 5 | 99 | Not observed |
| Comp. Ex. IV-1 | Sample IV-12 | 5 | 99 | Observed |
| Comp. Ex. IV-2 | PVDF soln. | 5 | 27 | Not observed |

Example IV-12

Coating Formulation, Electrode Plate

A negative-electrode coating formulation employed in this example and containing a negative-electrode active material was prepared by a procedure to be described next. Carbon powder obtained by thermal degradation of coal coke at 1,200° C., acetylene black as a conductive aid and the solution of Sample IV-6 described above in Table IV-1 were stirred and mixed at a mixing ratio of 90 parts, 5 parts and 80 parts at a rotation speed of 60 rpm for 120 minutes in the planetary mixer to obtain a slurry-form coating formulation with the negative-electrode active material contained therein.

The coating formulation containing the negative-electrode active material and obtained as described above was applied onto a copper-foil collector material of 20 µm in thickness by using the comma roll coater. After the thus-coated collector material was processed through a drying step, it was dried for 2 minutes in the oven controlled at 110° C., and was further dried for 2 minutes in the oven controlled at 150° C. to eliminate the solvent and to crosslink the binder, so that an active material layer was formed with a dry thickness of 100 µm on the collector material. A negative electrode plate obtained by the above-described procedure was pressed under the conditions of 5,000 kgf/cm$^2$ to make the active material layer uniform. Subsequently, aging was conducted for 48 hours in the vacuum oven controlled at 80° C. to fully eliminate volatiles (the solvent, water, etc.).

Parallel lines, which consisted of perpendicularly-intersecting 11 vertical lines and 11 horizontal lines, were drawn by a cutter at intervals of 1 mm on the active material layer of one of specimens cut from the negative electrode plate to form 100 squares within 1 cm$^2$. A mending tape was applied to the surface of the active material layer, and tape peeling was then conducted. The number of squares which did not peel off was determined as a measure of adhesion. The average of 10 tests was 96 squares. The solubility/swellability of the active material layer was also evaluated as in Example IV-1.

Examples IV-13 to IV-22 & Comparative Examples IV-3 to IV-4

Coating Formulations and Electrode Plates

Negative electrode plates were produced as in Example IV-12 except that the cyanoethylated polymer solutions described below in Table IV-4 were used in place of the cyanoethylated polymer solution in Example IV-12. Specimens cut from each negative electrode plate were tested for the adhesion of the active material layer to the collector and the solubility/swellability of the active material layer, respectively, as in Example IV-12. The results described below in Table IV-4 were obtained. It is to be noted that a 5% solution of polyvinylidene fluoride (PVDF solution) was used in Comparative Example IV-4.

TABLE IV-4

| Exs./Comp. Exs. | Cyanoethylated polymer solutions | Amount of cyanoethylated polymer solution used per 100 parts of active material (parts; solid content) | Adhesion (average value) | Solubility/swellability |
|---|---|---|---|---|
| Ex. IV-12 | Sample IV-6 | 4 | 96 | Not observed |
| Ex. IV-13 | Sample IV-1 | 5 | 96 | Not observed |
| Ex. IV-14 | Sample IV-2 | 3 | 89 | Not observed |
| Ex. IV-15 | Sample IV-3 | 8 | 98 | Not observed |
| Ex. IV-16 | Sample IV-4 | 2 | 95 | Not observed |
| Ex. IV-17 | Sample IV-5 | 1 | 94 | Not observed |
| Ex. IV-18 | Sample IV-7 | 3 | 93 | Not observed |
| Ex. IV-19 | Sample IV-8 | 3 | 96 | Not observed |
| Ex. IV-20 | Sample IV-9 | 3 | 98 | Not observed |
| Ex. IV-21 | Sample IV-10 | 3 | 99 | Not observed |
| Ex. IV-22 | Sample IV-11 | 5 | 98 | Not observed |
| Comp. Ex. IV-3 | Sample IV-12 | 5 | 98 | Observed |
| Comp. Ex. IV-4 | PVDF soln. | 5 | 34 | Not observed |

Example IV-23

Battery

An electrode unit was first constructed by using the positive electrode plate obtained above in Example IV-1 and the negative electrode plate obtained above in Example IV-12, and rolling them into a volute form with a separator interposed therebetween. The separator was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a battery of the AA size and 500 mAh rated capacity was assembled. Charged as an electrolyte into the battery was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of battery characteristics, a charge-discharge measuring instrument was used. Twenty (20) batteries were charged all together at the temperature condition of 25° C. and the current value of a 0.2 CA charging current, firstly in a charging direction until a battery voltage reached 4.1 V. After a break of 10 minutes, the batteries were discharged at the same current until 2.75 V was reached. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle was 96. With the batteries making use of the positive electrode plates of Examples IV-2 to IV-11 and the negative electrode plates of Examples IV-13 to IV-22, excellent results similar to those obtained above were also obtained.

Application to Capacitors

Example IV-1

The cyanoethylated polymer solution of Sample IV-3 (5 parts in terms of solid content), high-purity activated carbon powder (specific surface area: 1,500 $m^2$/g, average particle size: 10 μm; 100 parts) as an electrode active material and acetylene black (4 parts) as a conductive aid were charged in the planetary mixer, and NMP was added to give a total solid concentration of 43%, followed by mixing for 60 minutes. Subsequently, the mixture was diluted with NMP to a solid concentration of 41%, followed by further mixing for 10 minutes to obtain a coating formulation. Using the doctor blade, the coating formulation was applied onto a 20-μm thick aluminum foil, followed by drying at 80° C. for 30 minutes in a fan dryer. Using the roll press, pressing was then conducted to obtain a capacitor electrode plate having a thickness of 80 μm and a density of 0.6 g/$cm^3$. Specimens cut from the electrode plate were tested for its adhesion to the collector and its solubility/swellability in the solvent, respectively, as in Example IV-1 of the [Application to batteries]. The results are shown in Table IV-5.

Two specimens were provided by cutting out two discs of 15 mm in diameter from the electrode plate produced as described above, and were then dried at 200° C. for 20 hours. Those two specimens were arranged with their electrode layer sides opposing each other, and a cellulose-made, disc-shaped separator of 18 mm in diameter and 40 μm in thickness was held between the specimens. The thus-obtained electrode unit was placed in a coin-shaped package made of stainless steel (diameter: 20 mm, height: 1.8 mm, stainless steel thickness: 0.25 mm) and equipped with a polypropylene-made packing. An electrolyte was charged into the can such that no air was allowed to remain. A 0.2-mm thick stainless steel cap was put and fixed on the package with the polypropylene-made packing interposed therebetween. The can was then sealed to produce a coin-shaped capacitor of 20 mm in diameter and about 2 mm in thickness. As the electrolyte, a solution with tetraethylammonium tetrafluoroborate dissolved at a concentration of 1 mole/L in propylene carbonate was employed. The capacitor obtained as described above was measured for capacitance and internal resistance. The results are shown in Table IV-5.

Example IV-2

As in Example IV-1 except that the cyanoethylated polymer solution of Sample IV-1 was used at the same solid content in place of the cyanoethylated polymer solution employed in Example IV-1, an electrode plate and capacitor were produced, and the respective characteristics were evaluated. The results are shown in Table IV-5.

Example IV-3

As in Example IV-1 except that the cyanoethylated polymer solution of Sample IV-2 was used at the same solid content in place of the cyanoethylated polymer solution employed in Example IV-1, an electrode plate and capacitor were produced, and the respective characteristics were evaluated. The results are shown in Table IV-5.

Example IV-4

As in Example IV-1 except that the cyanoethylated polymer solution of Sample IV-4 was used at the same solid content in place of the cyanoethylated polymer solution employed in Example IV-1, an electrode plate and capacitor were produced, and the respective characteristics were evaluated. The results are shown in Table IV-5.

Example IV-5

As in Example IV-1 except that the cyanoethylated polymer solution of Sample IV-5 was used at the same solid content in place of the cyanoethylated polymer solution employed in Example IV-1, an electrode plate and capacitor were produced, and the respective characteristics were evaluated. The results are shown in Table IV-5.

Comparative Example IV-1

As in Example IV-1 except that the cyanoethylated polymer solution of Sample IV-12 was used at the same solid content in place of the cyanoethylated polymer solution employed in Example IV-1, an electrode plate and capacitor were produced, and the respective characteristics were evaluated. The results are shown in Table IV-5.

Comparative Example IV-2

As in Example IV-1 except that a 5% solution of polyvinylidene fluoride was used at the same solid content in place of the cyanoethylated polymer solution employed in Example IV-1, an electrode plate and capacitor were produced, and the respective characteristics were evaluated. The results are shown in Table IV-5.

The internal resistance and capacitance described below in Table IV-5 were measured and evaluated as will be described next. With respect to each capacitor obtained, its capacitance and internal resistance were measured at a current density of 20 mA/cm$^2$, and based on Comparative Example IV-2 as a reference, the capacitance and internal resistance were evaluated in accordance with the following evaluation standards, respectively. The greater the capacitance and the lower the internal resistance, the better the performance as a capacitor.

(Evaluation Standards for Capacitance)
- A: Capacitance greater by 20% or more than Comparative Example IV-2.
- B: Capacitance greater by 10% or more but less than 20% than Comparative Example IV-2.
- C: Capacitance equal to or smaller than Comparative Example IV-2.

(Evaluation Standards for Internal Resistance)
- A: Internal resistance lower by 20% or more than Comparative Example IV-2.
- B: Internal resistance lower by 10% or more but less than 20% than Comparative Example IV-2.
- C: Internal resistance equal to or higher than Comparative Example IV-2.

TABLE IV-5

| Exs./Comp. Exs. | Adhesion (average value) | Solubility/swellability | Capacitance | Internal resistance |
|---|---|---|---|---|
| Ex. IV-1 | 99 | Not observed | A | A |
| Ex. IV-2 | 95 | Not observed | A | A |
| Ex. IV-3 | 97 | Not observed | A | A |
| Ex. IV-4 | 99 | Not observed | A | A |
| Ex. IV-5 | 98 | Not observed | A | A |
| Comp. Ex. IV-1 | 99 | Observed | B | B |
| Comp. Ex. IV-2 | 32 | Not observed | — | — |

As evident from the above examples and comparative examples, a capacitor of large capacitance and low internal resistance can be obtained when electrode plates are produced using the coating formulation according the present invention and the capacitor is manufactured using the electrode plates.

Undercoating Formulations

Example IV-1

Undercoating Formulation, Electrode Plate

An undercoating formulation employed in this example and containing a conductive material was prepared by a procedure to be described hereinafter. Acetylene black as a conductive material and the solution of Sample IV-6 described above in Table IV-2 were stirred and mixed at a mixing ratio of 10 parts and 90 parts at a rotation speed of 60 rpm for 120 minutes in the planetary mixer to obtain a slurry-form undercoating formulation.

Using the undercoating formulation obtained as described above and employing, as a substrate, a collector material formed of a 20-μm thick aluminum foil, the undercoating formulation was applied onto one side of the substrate by the comma roll coater. The thus-coated substrate was then dried for 2 minutes in the oven controlled at 110° C., and was further dried for 2 minutes in the oven controlled at 150° C. to eliminate the solvent and to crosslink the binder, so that an undercoat layer was formed with a dry thickness of 1 μm on the collector material.

A positive-electrode coating formulation containing a positive-electrode active material was next prepared by a procedure to be described hereinafter. As materials for the positive-electrode coating formulation, LiCoO$_2$ powder having particle sizes of from 1 to 100 μm, acetylene black as a conductive aid and a 5% solution of polyvinylidene fluoride as a binder (PVDF solution) were stirred and mixed at a mixing ratio of 90 parts, 5 parts and 50 parts at a rotation speed of 60 rpm for 120 minutes in the planetary mixer to obtain a slurry-form, positive-electrode coating formulation with the positive-electrode active material contained therein.

Using the positive-electrode coating formulation obtained as described above, it was applied onto the surface of the undercoat layer by the comma roll coater. The thus-coated substrate was then dried for 2 minutes in the oven controlled at 110° C., and was further dried for 2 minutes in the oven controlled at 150° C. to eliminate the solvent, so that a positive electrode plate with an active material layer formed with a dry thickness of 100 μm on the undercoat layer was obtained. The positive electrode plate obtained by the above-described procedure was pressed under the conditions of 5,000 kgf/cm$^2$ to make the active material layer uniform. Subsequently, aging was conducted for 48 hours in the vacuum oven controlled at 80° C. to fully eliminate volatiles (the solvent, water, etc.), so that a positive electrode plate was obtained. With respect to the positive electrode plate, the adhesion and internal resistance were measured similarly to the foregoing, and were evaluated in accordance with the same standards as described above. The results described in Table IV-6 were obtained.

Examples IV-2 to IV-5

Undercoating Formulations, Electrode Plates

Undercoating formulations were prepared as in Example IV-1 except that the cyanoethylated polymer solutions described below in Table IV-6 were used in place of the cyanoethylated polymer solution for the undercoating formulation in Example IV-1, and then, electrode plates were produced as in Example IV-1. With respect to each of the electrode plates, the adhesion of the active material layer and the internal resistance were measured similarly to the foregoing, and were evaluated in accordance with the same standards as described above. The results described in Table IV-6 were obtained.

Comparative Example IV-1

An electrode plate with an active material layer formed thereon was produced as in Example IV-1 except that the undercoat layer was not formed. The adhesion of the active material layer and the internal resistance were measured similarly to the foregoing, and were evaluated in accordance with the same standards as described above. The results described in Table IV-6 were obtained.

TABLE IV-6

| Exs./ Comp. Exs. | Cyanoethylated polymer solutions | Adhesion (average value) | Internal resistance |
| --- | --- | --- | --- |
| Ex. IV-1 | Sample IV-6 | 98 | A |
| Ex. IV-2 | Sample IV-1 | 99 | A |
| Ex. IV-3 | Sample IV-2 | 90 | A |
| Ex. IV-4 | Sample IV-3 | 99 | A |
| Ex. IV-5 | Sample IV-5 | 95 | A |
| Comp. Ex. IV-1 | — | 34 | B |

Example IV-6

A negative electrode plate was produced as in Comparative Example IV-4 of the [Application to batteries] except that an undercoat layer was formed using the undercoating formulation employed in Example IV-1. The negative electrode plate was found to have excellent adhesion and internal resistance as in Example IV-1.

Example IV-7

A negative electrode plate was produced as in Comparative Example IV-2 of the [Application to capacitors] except that an undercoat layer was formed using the undercoating formulation employed in Example IV-1. The negative plate was found to have excellent adhesion and internal resistance as in Example IV-1 of the [Application to capacitors].

INDUSTRIAL APPLICABILITY

As has been described above, the present invention provides a coating formulation capable of forming a coating of excellent adhesion and solvent resistance on a surface of a metal material such as an aluminum material. The present invention also provides a coating formulation for manufacturing an electrode plate for a battery or a polarizable electrode plate for a capacitor, in which an active material layer has excellent adhesion to a collector made of an aluminum foil, copper foil or the like and is also equipped with excellent electrolyte resistance and improved contact resistance to the collector, an undercoating formulation, the electrode plate and its manufacturing process, the battery, and the capacitor.

The invention claimed is:

1. A coating formulation comprising:
   a polar solvent;
   a hydroxyl-containing resin, which is a modified polyvinyl alcohol; and
   at least one compound selected from the group consisting of an organic acid and a derivative thereof,
   wherein the modified polyvinyl alcohol and the at least one compound are contained in the polar solvent,
   wherein the modified polyvinyl alcohol has an introduced functional group other than hydroxyl groups and acetate groups, and is at least one alcohol selected from the group consisting of silanol-modified polyvinyl alcohols, cation-modified polyvinyl alcohols, cyanoethylated polyvinyl alcohols, and acetoacetyl-modified polyvinyl alcohols, and
   wherein the organic acid is a polybasic acid, and
   the polybasic acid is selected from the group consisting of 1,2,3-propanetricarboxylic acid, 1,2,4-cyclohexanetricarboxylic acid, 1,2,4,5-cyclohexanetetracarboxylic acid, 1,2,3,4-butanetetracarboxylic acid, trimellitic acid, pyromellitic acid, 1,4,5,8-naphthalenetetracarboxylic acid, and 1,2,3,4,5,6-cyclohexanehexacarboxylic acid.

2. The coating formulation according to claim 1, wherein the polar solvent is at least one polar solvent selected from the group consisting of N,N-dimethylformamide, N,N-dimethylacetamide, N-methyl-2-pyrrolidone, N-ethyl-2-pyrrolidone, vinylpyrrolidone, vinyl formamide, vinylacetamide, 1,3-dimethyl-2-imidazolidinone, dimethyl sulfoxide, water, methyl alcohol, ethyl alcohol, propyl alcohol, isopropyl alcohol, butyl alcohol and t-butyl alcohol.

3. The coating formulation according to claim 1, wherein:
   the modified polyvinyl alcohol has a polymerization degree from 300 to 5,000 and a saponification degree from 30 to 100%.

4. The coating formulation according to claim 1, wherein the at least one compound selected from the group consisting of the organic acid and the derivative thereof is contained in the coating formulation in an amount from 1 to 150 parts by weight relative to 100 parts by weight of the hydroxyl-containing resin.

5. The coating formulation according to claim 4, further comprising an active material that forms an electrode plate of a nonaqueous electrolyte secondary battery, an electrode plate of an electrode double layer capacitor, or an electrode plate of a lithium ion capacitor.

6. The coating formulation according to claim 5, further comprising, as a conductive aid, one of acetylene black, Ketjenblack, carbon nanofibers, and other carbon-based conductive aids.

7. An electrode plate for a nonaqueous electrolyte secondary battery, an electrode plate for an electrode double layer capacitor or an electrode plate for a lithium ion capacitor, comprising:

a collector; and an active material layer formed with an active material and a binder on a surface of the collector, wherein the binder is a hydroxyl-containing resin as defined in claim 1, in which the hydroxyl-containing resin has been crosslinked with at least one compound selected from the group consisting of a polybasic acid and a derivative thereof.

8. A manufacturing process of an electrode plate for a nonaqueous electrolyte secondary battery, an electrode plate for an electric double layer capacitor or an electrode plate for a lithium ion capacitor, comprising:

applying the coating formulation according to claim 5 for an electrode on a surface of a collector;

drying the coating formulation; and then heating the coating formulation at a temperature from 100 to 250° C. for a period from 1 to 60 minutes so as to form an active material layer.

9. The manufacturing process according to claim 8, wherein the collector is an aluminum foil, the active material is a positive-electrode active material, and the electrode plate is a positive electrode; or the collector is a copper foil or aluminum foil, the active material is a negative-electrode active material, and the electrode plate is a negative electrode.

10. A nonaqueous electrolyte secondary battery, an electric double layer capacitor, or a lithium ion capacitor comprising the electrode plate as defined in claim 7.

11. An undercoating formulation for manufacturing an electrode plate, comprising the coating formulation as defined in claim 1 with a conductive material contained therein.

12. An electrode plate for a nonaqueous electrolyte secondary battery, an electrode plate for an electric double layer capacitor, or an electrode plate for a lithium ion capacitor, comprising:

a collector;

an undercoat layer formed with the coating formulation as defined in claim 11 on a surface of the collector; and an active material layer formed on the undercoat layer.

13. A nonaqueous electrolyte secondary battery, an electric double layer capacitor, or a lithium ion capacitor, comprising the electrode plate as defined in claim 12.

14. A collector comprising an undercoat layer formed on a surface of a substrate by applying the coating formulation according to claim 11 and then heating said coating formulation.

15. The collector according to claim 14, further comprising an active material layer formed on said undercoat layer.

16. A coating formulation comprising:

a polar solvent; and a hydroxyl-containing resin, which is a modified polyvinyl alcohol, and at least one compound selected from the group consisting of an organic acid and a derivative thereof contained in the polar solvent, wherein the modified polyvinyl alcohol has an introduced functional group other than hydroxyl groups and acetate groups, and is a silanol-modified polyvinyl alcohol; and wherein the organic acid is a polybasic acid, and the polybasic acid is selected from the group consisting of 1,2,3-propanetricarboxylic acid, 1,2,4-cyclohexanetricarboxylic acid, 1,2,4,5-cyclohexanetetracarboxylic acid, 1,2,3,4-butanetetracarboxylic acid, trimellitic acid, pyromellitic acid, 1,4,5,8-naphthalenetetracarboxylic acid, and 1,2,3,4,5,6-cyclohexanehexacarboxylic acid.

17. The coating formulation according to claim 16, wherein the polar solvent is at least one polar solvent selected from the group consisting of N,N-dimethylformamide, N,N-dimethylacetamide, N-methyl-2-pyrrolidone, N-ethyl-2-pyrrolidone, vinylpyrrolidone, vinyl formamide, vinylacetamide, 1,3-dimethyl-2-imidazolidinone, dimethyl sulfoxide, water, methyl alcohol, ethyl alcohol, propyl alcohol, isopropyl alcohol, butyl alcohol and t-butyl alcohol.

18. The coating formulation according to claim 16, wherein the modified polyvinyl alcohol has a polymerization degree from 300 to 5,000 and a saponification degree from 30 to 100%.

19. The coating formulation according to claim 16, wherein the at least one compound selected from the group consisting of the organic acid and the derivative thereof is contained in the coating formulation in an amount from 1 to 150 parts by weight relative to 100 parts by weight of the hydroxyl-containing resin.

20. The coating formulation according to claim 19, further comprising an active material that forms an electrode plate of a nonaqueous electrolyte secondary battery, an electrode plate of an electrode double layer capacitor or an electrode plate of a lithium ion capacitor.

21. The coating formulation according to claim 20, further comprising, as a conductive aid, one of acetylene black, Ketjenblack, carbon nanofibers, and other carbon-based conductive aids.

22. An electrode plate for a nonaqueous electrolyte secondary battery, an electrode plate for an electrode double layer capacitor or an electrode plate for a lithium ion capacitor, comprising:

a collector; and an active material layer formed with an active material and a binder on a surface of the collector, wherein the binder is the hydroxyl-containing resin as defined in claim 16, in which the hydroxyl-containing resin has been crosslinked with at least one compound selected from the group consisting of a polybasic acid and a derivative thereof.

23. A manufacturing process of an electrode plate for a nonaqueous electrolyte secondary battery, an electrode plate for an electric double layer capacitor or an electrode plate for a lithium ion capacitor, comprising:

applying the coating formulation according to claim 20 on a surface of a collector for an electrode;

drying the coating formulation; and then heating the coating formulation at a temperature from 100 to 250° C. for a period from 1 to 60 minutes so as to form an active material layer.

24. The manufacturing process according to claim 23, wherein the collector is an aluminum foil, the active material is a positive-electrode active material, and the electrode plate is a positive electrode; or the collector is a copper foil or aluminum foil, the active material is a negative-electrode active material, and the electrode plate is a negative electrode.

25. A nonaqueous electrolyte secondary battery, an electric double layer capacitor, or a lithium ion capacitor comprising the electrode plate as defined in claim 22.

26. An undercoating formulation for manufacturing an electrode plate, comprising the coating formulation as defined in claim 16 with a conductive material contained therein.

27. An electrode plate for a nonaqueous electrolyte secondary battery, an electrode plate for an electric double layer capacitor, or an electrode plate for a lithium ion capacitor, comprising:

a collector;

an undercoat layer formed with the coating formulation as defined in claim 26 on a surface of the collector; and an active material layer formed on the undercoat layer.

28. A nonaqueous electrolyte secondary battery, an electric double layer capacitor, or a lithium ion capacitor, comprising the electrode plate as defined in claim 27.

29. A collector comprising an undercoat layer formed on a surface of a substrate by applying the coating formulation according to claim 26 and then heating said coating formulation.

30. The collector according to claim 29, further comprising an active material layer formed on said undercoat layer.

* * * * *